(12) United States Patent
Nishio

(10) Patent No.: US 9,319,658 B2
(45) Date of Patent: Apr. 19, 2016

(54) DIGITAL VIDEO SIGNAL OUTPUT DEVICE AND DISPLAY DEVICE, AND DIGITAL VIDEO SIGNAL OUTPUT METHOD AND RECEPTION METHOD

(75) Inventor: Toshiro Nishio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 938 days.

(21) Appl. No.: 13/520,340

(22) PCT Filed: Feb. 10, 2011

(86) PCT No.: PCT/JP2011/000765
§ 371 (c)(1),
(2), (4) Date: Jul. 2, 2012

(87) PCT Pub. No.: WO2011/099295
PCT Pub. Date: Aug. 18, 2011

(65) Prior Publication Data
US 2012/0281069 A1 Nov. 8, 2012

(30) Foreign Application Priority Data
Feb. 10, 2010 (JP) .................................. 2010-027234

(51) Int. Cl.
*H04N 13/00* (2006.01)
*H04N 21/4363* (2011.01)
*G09G 5/00* (2006.01)
(Continued)

(52) U.S. Cl.
CPC .......... *H04N 13/0059* (2013.01); *G09G 5/006* (2013.01); *H04N 13/0048* (2013.01); *H04N 13/0066* (2013.01); *H04N 21/43635* (2013.01); *G09G 3/003* (2013.01); *G09G 5/12* (2013.01); *G09G 2370/042* (2013.01); *G09G 2370/047* (2013.01); *G09G 2370/12* (2013.01); *H04N 13/0029* (2013.01)

(58) Field of Classification Search
CPC ....................... H04N 13/0059; H04N 13/0048
USPC ........................................................... 348/43
See application file for complete search history.

(56) References Cited

FOREIGN PATENT DOCUMENTS

| EP | 2090955 A1 | 8/2009 |
|---|---|---|
| JP | H07-327001 A | 12/1995 |
| JP | H09-016764 A | 1/1997 |

(Continued)

OTHER PUBLICATIONS

"High-Definition Multimedia Interface Specification Version 1.3a," Nov. 8, 2006, HDMI Licensing, LLC, Japan.

(Continued)

*Primary Examiner* — Sath V Perungavoor
*Assistant Examiner* — Jeffrey Williams
(74) *Attorney, Agent, or Firm* — James W. Judge

(57) ABSTRACT

Provided is a digital video signal output device for outputting digital video signals to a display device for displaying pictures. The digital video signal output device captures display capability data having described therein video-data structure such as a 3D format and the like from the digital video display device. The digital video signal output device is configured to select one video-data structure from at least one video-data structure, superimpose packet data including structural information that designates the selected video-data structure, during a blanking period of a digital video signal including video data based on the selected video-data structure, and transmits, as a digital video output signal, a signal obtained as a result of the superimposing.

6 Claims, 28 Drawing Sheets

(51) Int. Cl.
*G09G 3/00* (2006.01)
*G09G 5/12* (2006.01)

(56) References Cited

FOREIGN PATENT DOCUMENTS

| JP | H11-164304 A | 6/1999 | | |
|---|---|---|---|---|
| JP | 2000-041185 A | 2/2000 | | |
| JP | EP 1069776 A2 * | 1/2001 | ........... | H04N 19/503 |
| JP | 2001-103491 A | 4/2001 | | |
| JP | 2004-086550 A | 3/2004 | | |
| JP | 2005-102161 A | 4/2005 | | |
| JP | 2005-167895 A | 6/2005 | | |
| JP | 2009-296144 A | 12/2009 | | |
| WO | WO-02-35837 A2 | 5/2002 | | |
| WO | WO-02-100102 A1 | 12/2002 | | |
| WO | WO-2009-125573 A1 | 10/2009 | | |

OTHER PUBLICATIONS

"CEA Standard A DTV Profile for Uncompressed High Speed Digital Interfaces CEA-861-D," Jul. 2006, Consumer Electronics Association, Arlington.

* cited by examiner

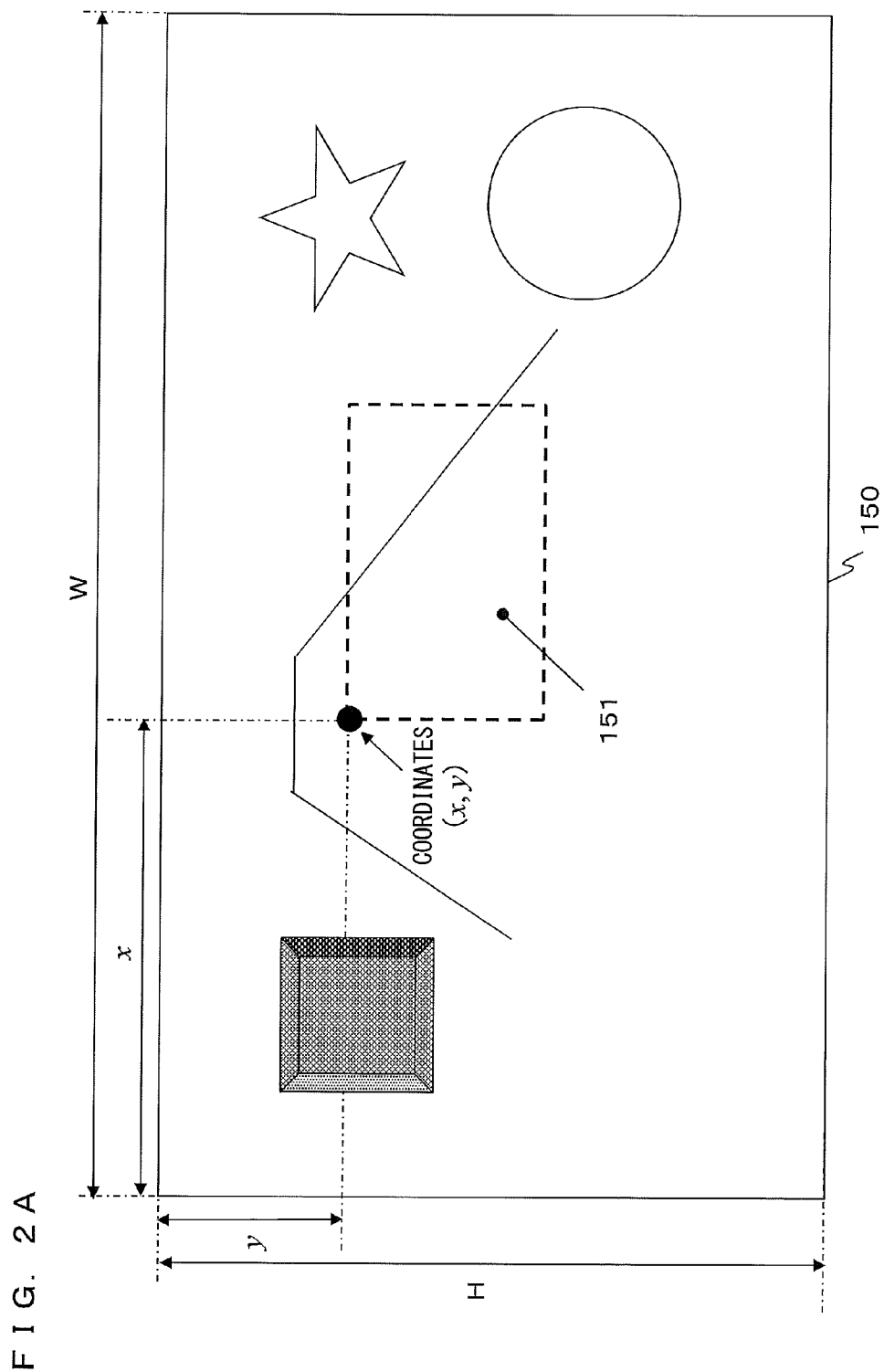

FIG. 3

| Byte # | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | HDMI_Video_present | | | | | |
| (9) | | | | | | | | |
| (10) | | | | | | | | |
| (11) | | | | | | | | |
| (12) | | | | | | | | |
| (13) | | | Multi_display_present | | | | | |
| (14) | (if Multi_Display_present != 00) | | | | | | | |
| | Multi_Display_Horizontal_Size [15...8] | | | | | | | |
| | Multi_Display_Horizontal_Size [7...0] | | | | | | | |
| | Multi_Display_Vertical_Size [15...8] | | | | | | | |
| | Multi_Display_Vertical_Size [7...0] | | | | | | | |
| | (if Multi_Display_present = 10) | | | | | | | |
| | Multi_Display_MASK_15...8 | | | | | | | |
| | Multi_Display_MASK_7...0 | | | | | | | |
| ()...N | Reserved (0) | | | | | | | |

FIG. 5

| Packet Byte # | 7 | 6 | 5 | 4 | 3 | 2 | 1 | 0 |
|---|---|---|---|---|---|---|---|---|
| PB0 | Checksum ||||||||
| PB1 | 24bit IEEE Registration Identifier (0x000C03) <br> (least significant byte first) ||||||||
| PB2 | |||||||||
| PB3 | |||||||||
| PB4 | HDMI_Video_Format ||| Reserved(0) | Reserved(0) | Reserved(0) | Reserved(0) | Reserved(0) |
| PB5 | Xposition [15...8] ||||||||
| | Xposition [7...0] ||||||||
| | Yposition [15...8] ||||||||
| | Yposition [7...0] ||||||||
| ...PB(Nv) | Reserved (0) ||||||||

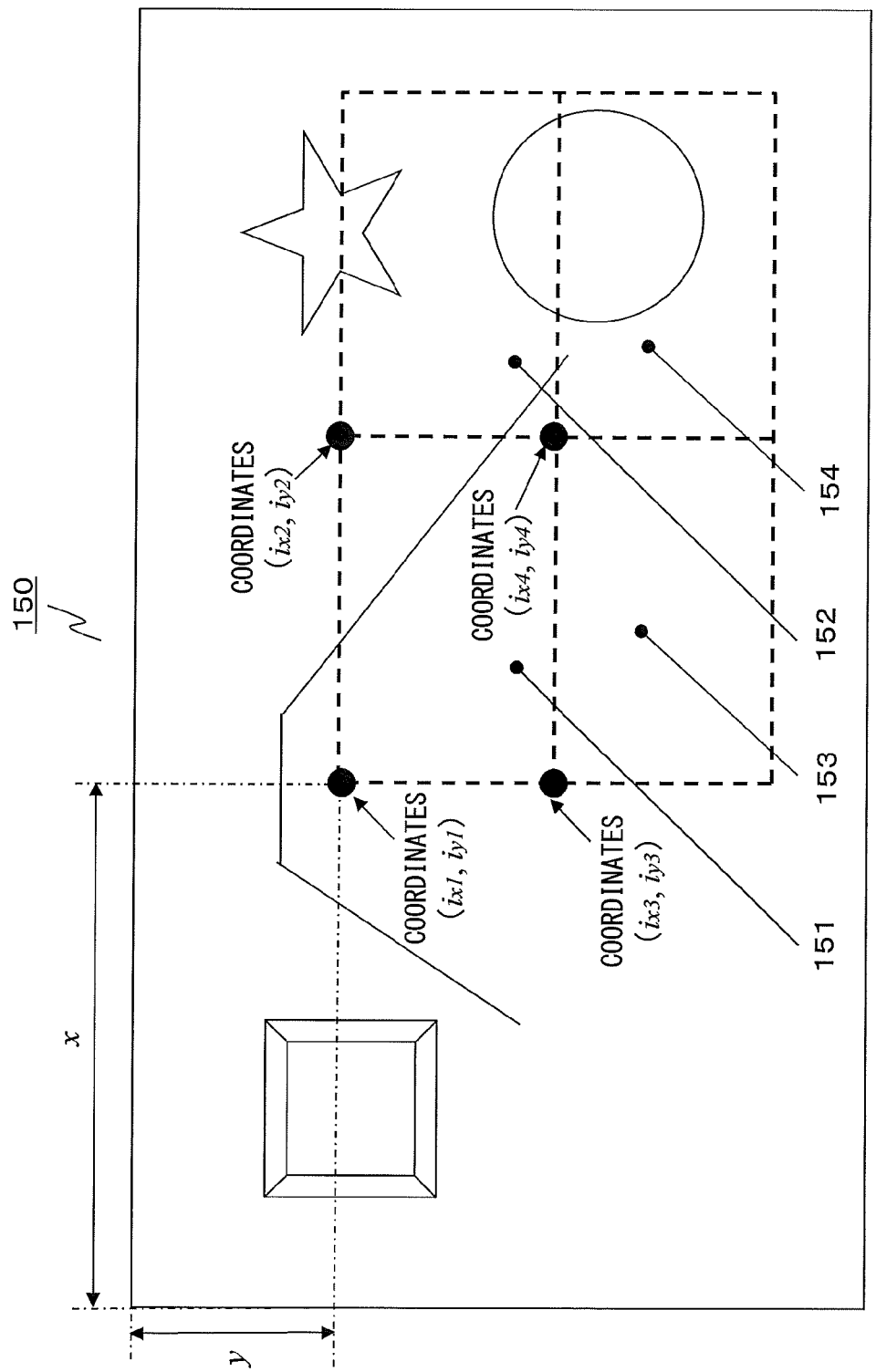

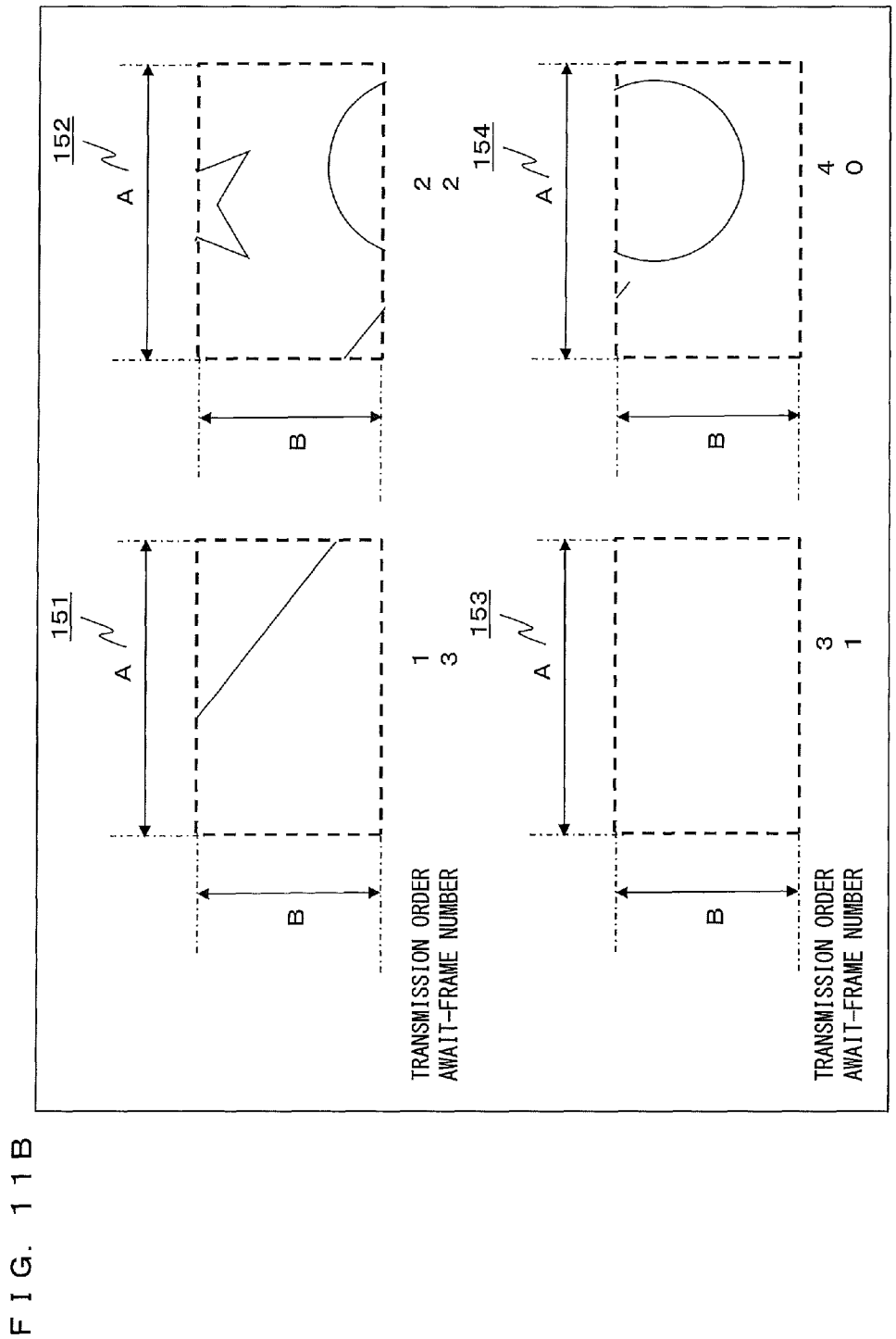

F I G. 1 2

| Packet Byte # | 7 | 6 | 5 | 4 | 3 | 2 | 1 | 0 |
|---|---|---|---|---|---|---|---|---|
| PB0 | Checksum ||||||||
| PB1 | 24bit IEEE Registration Identifier (0x000C03) (least significant byte first) ||||||||
| PB2 |  ||||||||
| PB3 |  ||||||||
| PB4 | HDMI_Video_Format ||| Reserved(0) | Reserved(0) | Reserved(0) | Reserved(0) | Reserved(0) |
| PB5 | CurrentTime ||||||||
|  | Offset ||||||||
|  | Xposition |||| Yposition ||||
| ...PB(Nv) | Reserved (0) ||||||||

FIG. 21

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0x000C03) (least significant byte first) | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | HDMI_Video_present | | | | | |
| (9) | | | | | | | | |
| (10) | | | | | | | | |
| (11) | | | | | | | | |
| (12) | | | | | | | | |
| (13) | 3D_present | 3D_Multi_present | | | | | | |
| (14) | | | | HDMI_3D_LEN | | | | |
| (15) | (if 3D_Multi_present = 01 or 10) | | | | | | | |
| | 3DStructureALL_15...8 | | | | | | | |
| | 3DStructureALL_7...0 | | | | | | | |
| | (if 3D_Multi_present = 10) | | | | | | | |
| | 3DMASK_15...8 | | | | | | | |
| | 3DMASK_7...0 | | | | | | | |
| | 2DVICOrder_1 | | | | 3DStructure_1 | | | |
| | 3DDetail_1 *** | | | | Reserved(0) *** | | | |
| | ... | | | | | | | |
| | 2DVICOrder_L | | | | 3DStructure_L | | | |
| ( )*..N | Reserved (0)** | | | | | | | |

F I G. 22

| Packet Byte # | 7 | 6 | 5 | 4 | 3 | 2 | 1 | 0 |
|---|---|---|---|---|---|---|---|---|
| PB0 | Checksum ||||||||
| PB1 | 24bit IEEE Registration Identifier (0x000C03) <br> (least significant byte first) ||||||||
| PB2 |  ||||||||
| PB3 |  ||||||||
| PB4 | HDMI_Video_Format ||| Reserved(0) | Reserved(0) | Reserved(0) | Reserved(0) | Reserved(0) |
| PB5 | 3DStructure |||| Reserved(0) | Reserved(0) | Reserved(0) | Reserved(0) |
| …PB(Nv) | Reserved(0) ||||||||

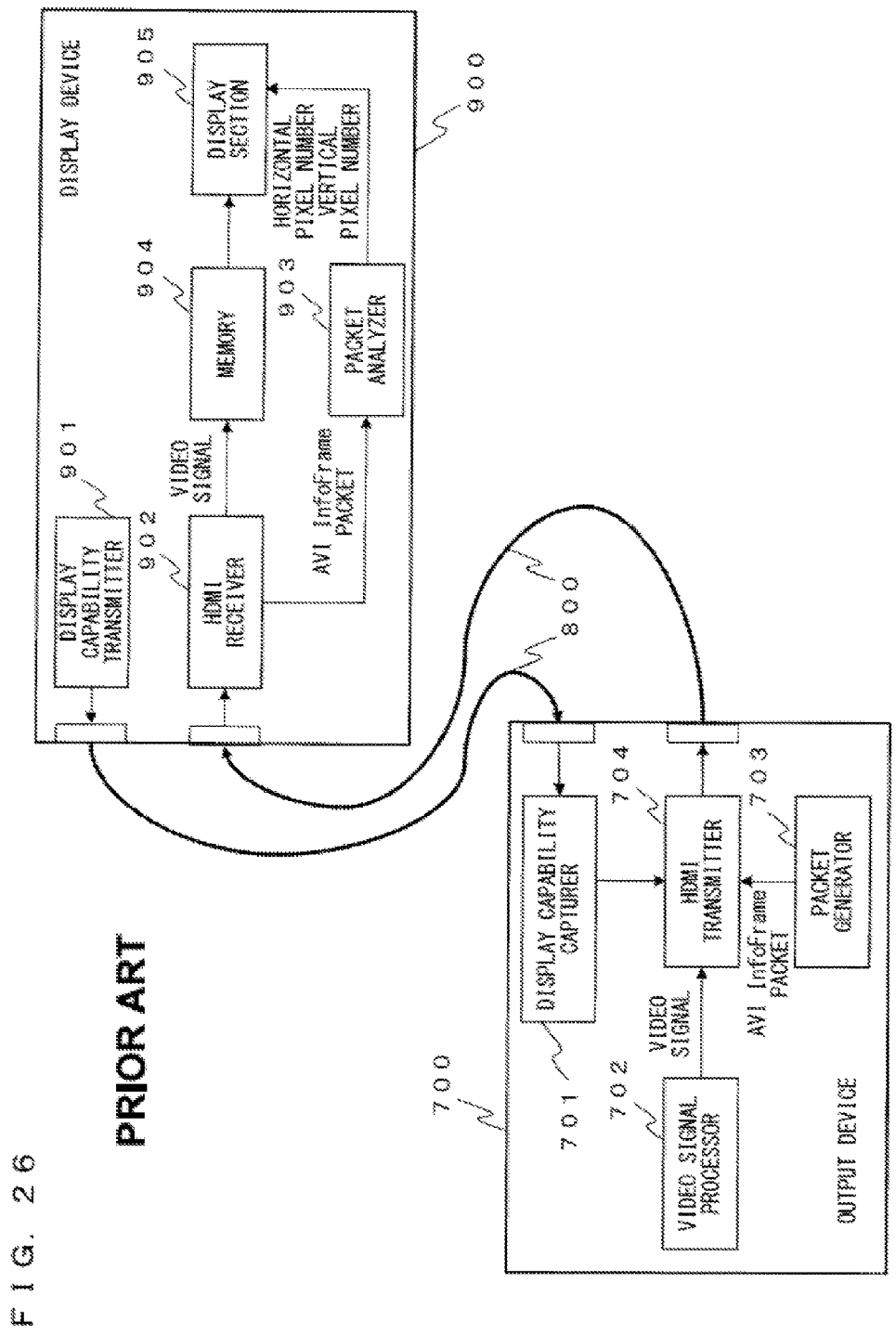

DIGITAL VIDEO SIGNAL OUTPUT DEVICE AND DISPLAY DEVICE, AND DIGITAL VIDEO SIGNAL OUTPUT METHOD AND RECEPTION METHOD

TECHNICAL FIELD

The present invention relates to digital video signal output devices and display devices for transmitting digital video signals.

BACKGROUND ART

Conventional methods for transmitting digital video signals include, for example, an HDMI transmission method disclosed in Non-Patent Literature 1. FIG. 26 shows the conventional transmission method disclosed in Non-Patent Literature 1. In an output device 700 in FIG. 26, a display capability capturer 701 receives EDID (Extended Display Identification Data) indicating display capability of a display device 900 from a display capability transmitter 901 included in the display device. Described in the EDID is a VIC (Video Identification Code) that specifies a video format of two-dimensional pictures that can be displayed by the display device 900 (for details, cf. Non-Patent Literature 2). The video format specifies screen resolution (horizontal and vertical pixel numbers), field rate, screen aspect ratio, pixel aspect ratio, etc. A video signal processor 702 generates digital video signals. A packet generator 703 generates an AVI InfoFrame packet including the VIC of the digital video signals, and the like. An HDMI transmitter 704 transmits the digital video signals obtained from the video signal processor 702 to the display device 900 via a transmission cable 800, during a video-data period based on the HDMI specification. Furthermore, the HDMI transmitter 704 transmits the AVI InfoFrame packet obtained from the packet generator 703 to the display device 900, during a blanking period based on the HDMI specification.

Then, in the display device 900, an HDMI receiver 902 receives the signals transmitted by the output device 700, and acquires, from the received signals, the AVI InfoFrame packet and the digital video signals. Next, the HDMI receiver 902 outputs the digital video signals to a memory 904, and outputs the AVI InfoFrame packet to a packet analyzer 903. The packet analyzer 903 analyzes the AVI InfoFrame packet outputted from the HDMI receiver 902, and obtains the video format corresponding to the digital video signals. The memory 904 temporarily stores the video signals outputted from the HDMI receiver 902. A display section 905 displays pictures from the video signals stored in the memory 904 by using the video format obtained through an analysis by the packet analyzer 903.

CITATION LIST

Non Patent Literature

[NPL 1] High-Definition Multimedia Interface Specification Version 1.3a (Nov. 8, 2006, HDMI Licensing, LLC)
[NPL 2] CEA-861-D (July 2006, Consumer Electronics Association)

SUMMARY OF THE INVENTION

Problems to be Solved by the Invention

In recent years, numerous 3D televisions for displaying three-dimensional pictures have been introduced. However, for transmitting three-dimensional pictures in accordance with the conventional HDMI specification, it is necessary to describe a 3D format, and video format corresponding to the 3D format, to specify the format, such as Side-by-Side, of the right-and-left images. Yet it is not possible to place such a description into an EDID or AVI InfoFrame of the current HDMI specification.

In addition, in hitherto known inventions, in order to allow displaying on display devices having a very large number of horizontal and vertical pixels, it is necessary for output devices to output digital video signals including the same number of horizontal and vertical pixels as those of display devices. By doing so, data rate needed for transmission increases associated with an increase in the number of pixels of the display devices. In such situation, when the data rate exceeds the upper limit transmittable by a transmission cable, there may be cases where picture signals cannot be transmitted.

An objective of the present invention is to provide a digital video signal output device and a digital signal reception device realizing transmission of video signals that can flexibly handle various display styles, in particular, three-dimensional images and high resolution video pictures with a use of HDMI. This is achieved by enabling transmitting, within capacity limits of EDID and InfoFrame, information that needs to be transmitted for 3D televisions and high resolution televisions while still supporting transmission and reception of conventional VIC or the like which the 3D televisions and high resolution televisions are required to be capable of handling when transmitting and receiving EDID and InfoFrame.

In addition, another objective of the present invention is to provide a digital video signal output device and a digital signal reception device adapted to output digital video signals through HDMI, and allow displaying on display devices having a very large number of horizontal and vertical pixels.

Solution to the Problems

In order to achieve the above described objective(s), the present invention has the following features. The present invention is a digital video signal output device for outputting digital video output signals to an external digital video display device via a transmission interface having a predefined upper limit on its data transmission rate. The digital video signal output device includes: a difference detector configured to detect, as a cutout image, a rectangular area that is a portion of an entire image in a single frame of the digital video signal, the image in the rectangular area including a zone where a difference between the entire image in a single frame of the digital video signal and the entire image one frame previous to said frame has occurred, and configured to output cutout-area information specifying at least the rectangular area's position within the entire image; and a transmitter configured to output a digital video output signal by transmitting, during a video-data period, data representing the cutout image and transmitting, during a blanking period, the cutout-area information.

Furthermore, the present invention relates to a digital video signal output device for outputting a digital video output signal to a digital video display device for displaying a three-dimensional picture. The output device includes: a display capability capturer configured to capture, from the digital video display device, display capability data having described therein at least one 3D format in which the digital video display device is capable of displaying, and at least one video format corresponding to each of the at least one 3D format; and a transmitter configured transmit a digital video output signal by selecting one 3D format among the at least one 3D format captured by the display capability capturer, selecting one video format among the at least one video format corresponding to the selected 3D format, transmitting, during a video-data period, video data of a three-dimensional picture formed based on the selected 3D format and the selected video format, and transmitting, during a blanking period, structural information specifying the selected 3D format and format information specifying the selected video format.

Furthermore, the present invention is a digital video display device for displaying a video picture based on a digital video input signal inputted via a transmission interface having a predefined upper limit on its data transmission rate. The digital video display device includes: a receiver configured to receive a digital video input signal having transmitted therein, during a video-data period thereof, data of a cutout image which is a rectangular area that is a portion of an entire image in a single frame of the digital video signal, the image in the rectangular area including a zone where a difference between the entire image in a single frame of the digital video signal and the entire image one frame previous to said frame has occurred, acquire data for the cutout image from the received signal, and acquire cutout-area information specifying at least the rectangular area's position within the entire image transmitted during a blanking period of the digital video input signal; an image restorer configured to restore an entire image for a single frame and to generate a for-display video signal, based on the data for the cutout image and on the cutout-area information; a display section configured to display a picture based on the for-display video signal.

Furthermore, the present invention relates to a digital video signal device for receiving a digital video input signal from a digital video signal output device and displaying a three-dimensional picture based on the received signal. The digital video display device includes: a display capability transmitter configured to transmit, to the digital video signal output device, display capability data having described therein at least one 3D format in which the digital video display device is capable of displaying and at least one video format corresponding to each of the at least one 3D format, in accordance with a request from a display capability capturer of the digital video signal output device; a receiver configured to receive the digital video input signal, and acquire, from the received signal, video data, structural information having designated therein one 3D format among the at least one 3D format, and format information having designated therein a video format corresponding to the 3D format; an image restorer configured to generate a for-display video signal, based on the structural information and the format information acquired by the receiver from the video data; and a display section configured to display a picture based on the for-display video signal.

Furthermore, the present invention is a digital video signal transmission method for outputting digital video output signals to an external digital video display device via a transmission interface having a predefined upper limit on its data transmission rate. The method includes: a detection step of detecting, as a cutout image, a rectangular area that is a portion of an entire image in a single frame of the digital video signal, the image in the rectangular area including a zone where a difference between the entire image in a single frame of the digital video signal and the entire image one frame previous to said frame has occurred, and outputting cutout-area information that specifies at least the rectangular area's position within the entire image; and a transmission step of outputting the digital video output signal by transmitting, during a video-data period, data representing the cutout image and transmitting, during a blanking period, the cutout-area information.

Furthermore, the present invention relates to a digital video signal transmission method for outputting a digital video output signal to a digital video display device that displays a three-dimensional picture. The transmission method includes: a capture step of capturing, from the digital video display device, display capability data having described therein at least one 3D format in which the digital video display device is capable of displaying, and at least one video format corresponding to each of the at least one 3D format; and a transmission step of transmitting the transmission digital video output signal by selecting one 3D format among the captured at least one 3D format, selecting one video format among the at least one video format corresponding to the selected 3D format, transmitting, during a video-data period, video data of a three-dimensional picture formed based on the selected 3D format and the selected video format, and transmitting, during a blanking period, structural information having designated therein the selected 3D format and format information having designated therein the selected video format.

Furthermore, the present invention is a digital video signal reception method for display a video picture based on a digital video input signal inputted via a transmission interface having a predefined upper limit on its data transmission rate. The method includes: a reception step of receiving a digital video input signal having transmitted therein, during a video-data period thereof, data of a cutout image which is a rectangular area that is a portion of an entire image in a single frame of the digital video signal, the image in the rectangular area including a zone where a difference between the entire image in a single frame of the digital video signal and the entire image one frame previous to said frame has occurred, acquiring data for the cutout image from the received signal, and acquiring cutout-area information that specifies at least the rectangular area's position within the entire image transmitted during a blanking period of the digital video input signal; and an image restoration step of restoring an entire image for a single frame, and to generate a for-display video signal, based on the data for the cutout image and on the cutout-area information.

Furthermore, the present invention relates to a digital video signal reception method that is used by a digital video display device configured to display a three-dimensional picture and that is for receiving a digital video input signal from a digital video signal output device. The reception method includes: a transmission step of transmitting, to the digital video signal output device, at least one 3D format in which the digital video display device is capable of displaying, and display capability data having described therein at least one video format corresponding to each of the at least one 3D format; a reception step of receiving the digital video input signal, and acquiring, from the received signal, video data, structural information having designated therein one 3D format among the at least one 3D format, and format information having designated therein a video format corresponding to the video data; an image restoration step of generating a for-display video signal, based on the structural information and the format information acquired at the reception step from the video data.

Advantageous Effects of the Invention

With the present invention, in a case where a display device includes a high definition display section having a very large number of horizontal and vertical pixels, only a difference between a video signal of a present single frame and a video signal of one frame immediately preceding said frame is transmitted from an output device via a transmission device. As a result, signal transmission to the high resolution display section becomes possible without increasing a data rate at which transmission is conducted on a transmission cable. Therefore, the present invention can achieve signal transmission of high resolution video pictures at a transmission rate that does not exceed an upper limit of a data transmission rate of the transmission cable.

BRIEF DESCRIPTION OF THE DRAWINGS

FIG. 2A shows an example of an entire image used for describing operations of the first embodiment of the present invention.

FIG. 3 shows a data format in connection with EDID extension portions for HDMI vendor use, which are transmitted from the display device to the output device according to the first embodiment of the present invention.

FIG. 5 shows a data format of a specific InfoFrame packet in the first embodiment of the present invention.

FIG. 11A shows an example of an entire image used for describing operations of the second embodiment of the present invention.

FIG. 11B shows an example of a cutout image used for describing operations of the second embodiment of the present invention.

FIG. 12 shows a data format of a specific InfoFrame packet according to the second embodiment of the present invention.

FIG. 21 shows a data format in connection with EDID extension portions for HDMI vendor use, which are transmitted from a display device to the output device according to the third embodiment of the present invention.

FIG. 22 shows a data format of a specific InfoFrame packet in the third embodiment of the present invention.

FIG. 26 is a block diagram of an output device and a display device which are hitherto known.

DESCRIPTION OF EMBODIMENTS

First Embodiment

Figure 1:
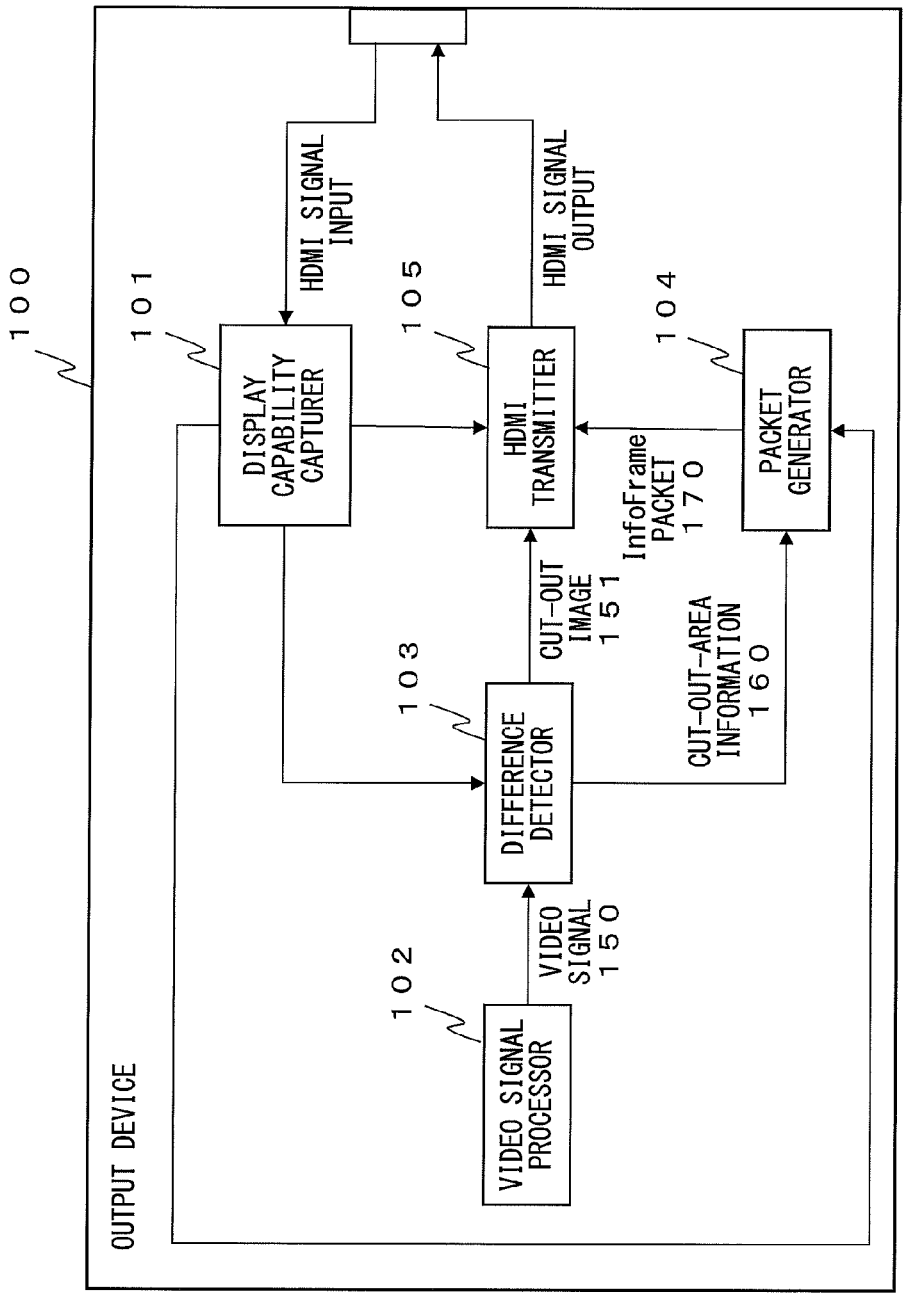
FIG. 1 is a block diagram of an output device of a first embodiment of the present invention.

In the following, a first embodiment of the present invention will be described with reference to the drawings. FIG. 1 is a block diagram showing a configuration of an output device (corresponding to a SOURCE in the HDMI ver. 1.3a specification) according to the first embodiment of the present invention. As shown in FIG. 1, an output device 100 includes a display capability capturer 101, a video signal processor 102, a difference detector 103, a packet generator 104, and an HDMI transmitter 105.

Figure 7:
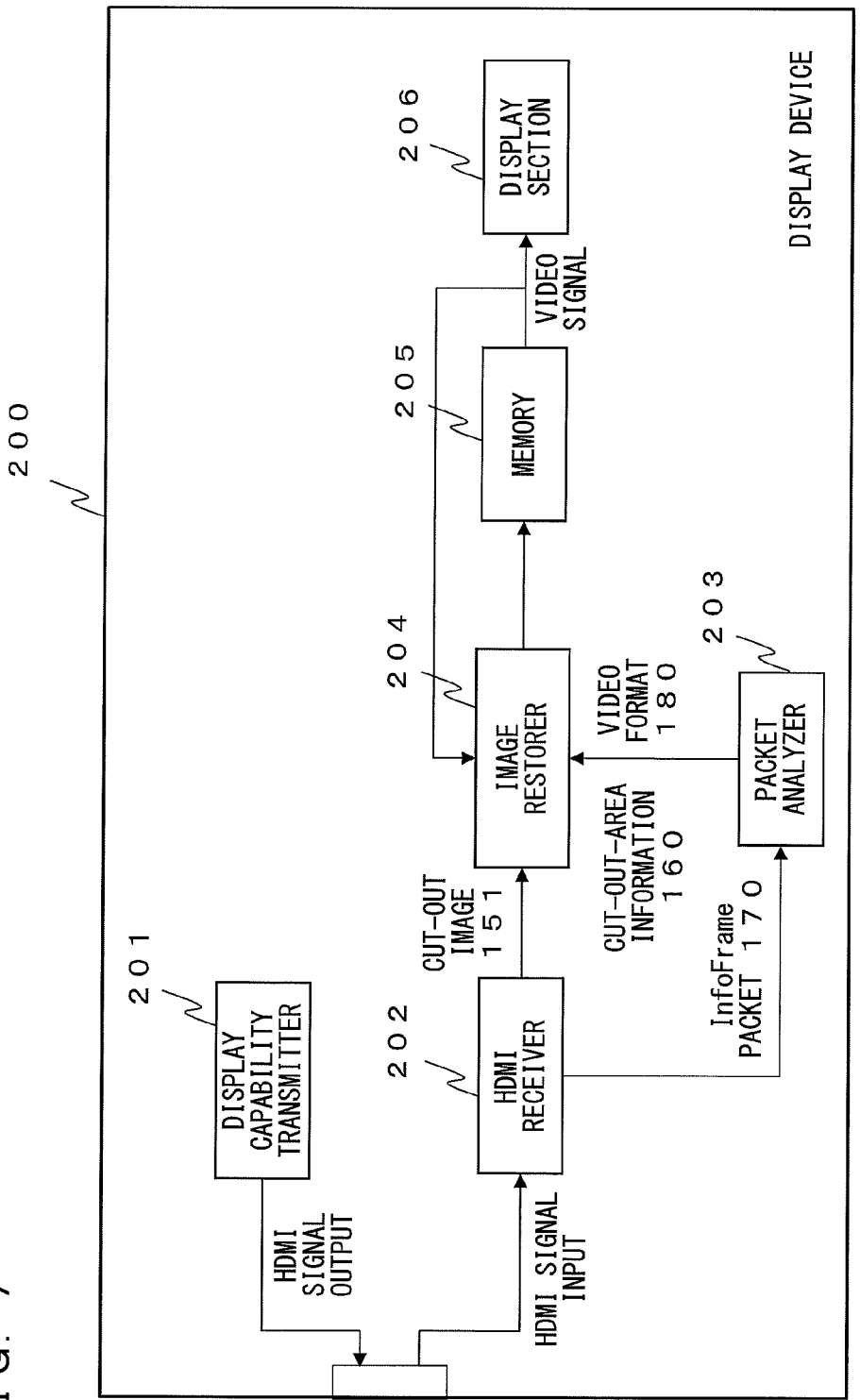
FIG. 7 is a block diagram of the display device according to the first embodiment of the present invention.

The display capability capturer 101 captures EDID from a display device 200 which is described later using FIG. 7. In the EDID, other than video formats (resolution, field rate, image and pixel aspect ratios, etc.,) that are supported by the display device 200, functions and properties of the display device 200 are described. Details of the EDID will be described later using FIG. 3.

For example, the video signal processor 102 generates a video signal 150 for an entire image with a horizontal pixel number W and a vertical pixel number H as shown in FIG. 2A, and outputs the generated signal to the difference detector 103.

Figure 2B:
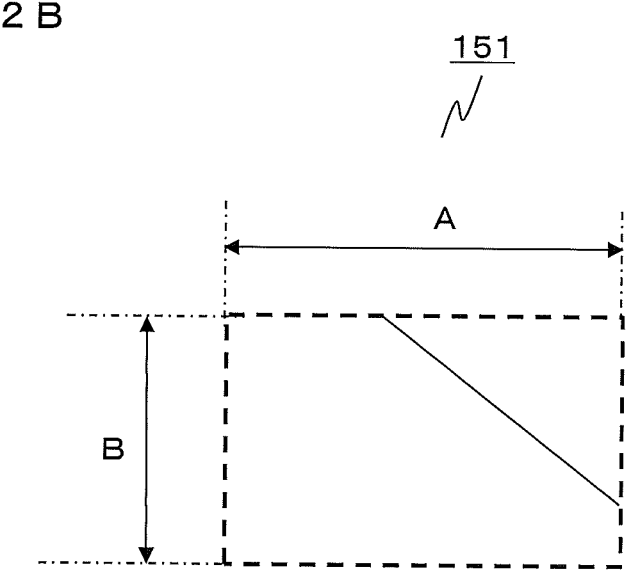
FIG. 2B shows an example of a cutout image used for describing operations of the first embodiment of the present invention.

The difference detector 103 detects a difference between the entire image in the current frame and the entire image in the immediately preceding frame in the video signal 150. Next, the difference detector 103 cuts out an area including a part having the difference, as a cutout image 151. Then, the difference detector 103 outputs the cutout image 151 to the HDMI transmitter 105. For example, the difference detector 103 cuts out, as the cutout image 151, an area whose horizontal size is A number of pixels and vertical size is B number of pixels as shown in FIG. 2B when an upper left corner of the area is x number of pixels in the horizontal direction and y number of pixels in the vertical direction from the upper left corner of the video signal 150 as shown in FIG. 2A. Then, the difference detector 103 outputs the values of x, y, A, and B of the cutout image 151 to the packet generator 104 as cutout-area information 160.

The packet generator 104 converts the cutout-area information 160 into an InfoFrame packet 170 that is transmitted during a flyback period (Blanking Period) of an HDMI signal, and outputs the InfoFrame packet 170 to the HDMI transmitter 105. The InfoFrame packet 170 includes the above described AVI InfoFrame as well as another InfoFrame packet (referred to as a specific InfoFrame packet in the following description), and details of the other InfoFrame packet is described later using FIG. 5.

The HDMI transmitter 105 generates an HDMI signal using the cutout image 151 from the difference detector 103, and generates the InfoFrame packet 170 from the packet generator 104. Then, the HDMI transmitter 105 transmits the generated HDMI signal to a channel for TMDS (Transition Minimized Differential Signal: registered trademark; description thereof is omitted; references for details of TMDS include Non-Patent Literature 1). Details of the HDMI signal transmitted by the HDMI transmitter 105 will be described later using FIG. 4.

It should be noted that the HDMI transmitter 105 transmits the HDMI signal to the display device 200 only in a case where the EDID captured by the display capability capturer 101 indicates that "the display device 200 can receive the HDMI signal and can display the cutout image 151 included in the HDMI signal based on the description in the InfoFrame packet 170" (in the following, for convenience of descriptions, such a case will be referred to as "a case in which multi-display mode is supported"; and a method for displaying the picture will be referred to as "multi-display mode").

FIG. 3 illustrates a data format in connection with EDID extension portions for HDMI vendor use, according to the present embodiment. In the top row in FIG. 3, 0 . . . 7 each represents a bit number in each byte. Furthermore, in the leftmost column in FIG. 3, 0 . . . N each represents a byte number. In FIG. 3, except for HDMI_Video_present in the eighth byte, values stored up to the twelfth byte are values defined based on the HDMI ver. 1.3a specification, and descriptions thereof are omitted in the present embodiment since details of those are disclosed in Non-Patent Literature 1.

HDMI_Video_present is a one-bit value having described therein whether or not extended fields in the thirteenth byte and beyond in FIG. 3 are to be used. In the present embodiment, HDMI_Video_present is 1.

A two-bit value is stored in Multi_display_present which is the thirteenth byte in FIG. 3. The following information is indicated when this value is 00, 01, 10, or 11 (all of which are binary numbers).
00: The display device 200 does not support the multi-display mode.
01: The display device 200 has fields regarding multi-display horizontal size [15 . . . 0] and multi-display vertical size [15 . . . 0], and the display device 200 can be used for all video formats described in a Video Data Block of the EDID. Multi_Display_MASK which is described later is not used.
10: Fields regarding later described multi-display horizontal size [15 . . . 0] and multi-display vertical size [15 . . . 0] exist; and only a video format specified by a VIC indicated by Multi_Display_MASK is supported.
11: Reserved Multi_Display_Horizontal_Size [15 . . . 0] represents, in a two-byte value, a horizontal pixel number of a display section 206 included in the display device 200. The horizontal pixel number corresponds to a total pixel number W in the horizontal direction in FIG. 2A.

Multi_Display_Vertical_Size [15 . . . 0] represents, in a two-byte value, a vertical pixel number of the display section 206 included in the display device 200. The horizontal pixel number corresponds to a total pixel number H in the vertical direction in FIG. 2A.

When the values in each bit of Multi_Display_MASK_i ("i" is an integer from 0 to 15) are 1, a display device 220 supports a video format corresponding to a VIC described in the i-th Video Data Block of the EDID.

Here, the video format specified by Multi_Display_MASK_i includes information regarding the horizontal pixel number and the vertical pixel number. In FIG. 2B, "A" represents the horizontal pixel number of the video format specified by Multi_Display_MASK_i. In FIG. 2B, "B" represents the vertical pixel number of the video format specified by Multi_Display_MASK_i. On the other hand, the horizontal pixel number and the vertical pixel number of the display section 206 included in the display device 200 are defined by Multi_Display_Horizontal_Size [15 . . . 0] and Multi_Display_Vertical_Size [15 . . . 0]. For example, when the video format corresponding to the VIC specified by Multi_Display_MASK_i supports 1920×1080p, the display device 200 receives an HDMI signal of 1920×1080p if Multi_Display_Horizontal_Size [15 . . . 0] is 20000 and Multi_Display_Vertical_Size [15 . . . 0] is 10000; and, the display size outputted by the display section 206 becomes a size defined by Multi_Display_Horizontal_Size [15 . . . 0] and Multi_Display_Vertical_Size [15 . . . 0].

Furthermore, when an HDMI receiver 202 of the display device 200 is capable of handling multiple sets of horizontal pixel numbers and vertical pixel numbers, multiple VICs that can be handled may be represented using Multi_Display_MASK_i. Conversely, when it is known in advance that only a cutout image having a specific size can be transmitted between the output device 100 and the display device 200, the output device 100 does not have to read the information in the EDID. However, it is necessary to always include, in the EDID, the horizontal pixel number Multi_Display_Horizontal_Size [15 . . . 0] and Multi_Display_Vertical_Size [15 . . . 0] of the display section 206.

Figure 4:
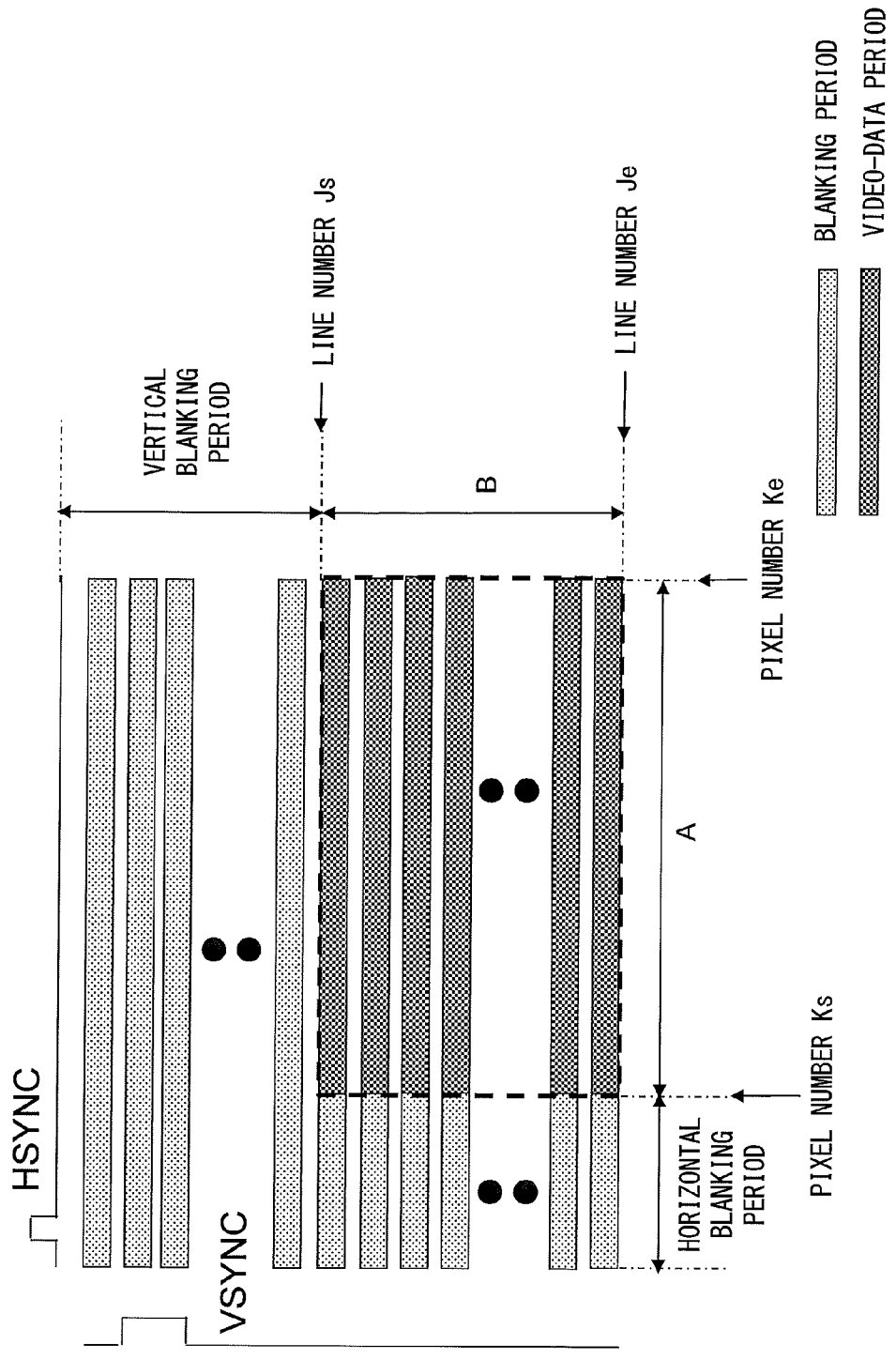
FIG. 4 shows an example of an HDMI signal transmitted by an HDMI transmitter.

Next, FIG. 4 shows an example of an HDMI signal transmitted by the HDMI transmitter 105. In a video-data period in FIG. 4, a signal of video data encoding the cutout image 151 is transmitted based on one video format selected among video formats supported by the display device. Line numbers Js, Je, and pixel numbers Ks, Ke defining this video period are described in the AVI InfoFrame packet transmitted during a blanking period (a collective term of a horizontal blanking period and a vertical blanking period), and, by referring to the AVI InfoFrame packet, the display device can acquire the video data. Furthermore, a signal of the InfoFrame packet 170 including the AVI InfoFrame packet is transmitted during either the horizontal blanking period or the vertical blanking period.

FIG. 5 shows a data format of the specific InfoFrame packet in the InfoFrame packet 170 according to the present embodiment. In the top row in FIG. 5, 0 . . . 7 each represents a bit number in each byte. Furthermore, in the leftmost column in FIG. 5, 0 . . . N each represents a byte number. In FIG. 5, stored values up to PB3 are values defined based on the HDMI ver. 1.3a specification, and details thereof are disclosed in Non-Patent Literature 1 and Non-Patent Literature 2 and thereby descriptions of those are omitted in the present embodiment.

HDMI_Video_Format is a value specifying whether or not a video-data structure other than the video format is supported, and when the value is a specific value (e.g., 011 in binary numbers), it indicates that the display device 200 "supports the multi-display mode." Reserved(0) represents a bit reserved for extension, and 0 is described therein.

Xposition [15 . . . 0] is a two-byte value specifying "x" in FIG. 2A. Yposition [15 . . . 0] is a two-byte value specifying "y" in FIG. 2A. It should be noted that, values of A and B in FIG. 2B are defined by the horizontal pixel number and the vertical pixel number described by the AVI InfoFrame (for details, cf. Non-Patent Literature 2). It should also be noted that, other than the manner described above, the position and size of the cutout image 151 in FIG. 2A may be specified from coordinates of two pixels located on a diagonal of the area (e.g., coordinates of a pixel at the upper left corner, and coordinates of a pixel at the lower right corner). In this case, two of each of the Xposition [15 . . . 0] and Yposition [15 . . . 0] corresponding to the pixels exist.

Figure 6:
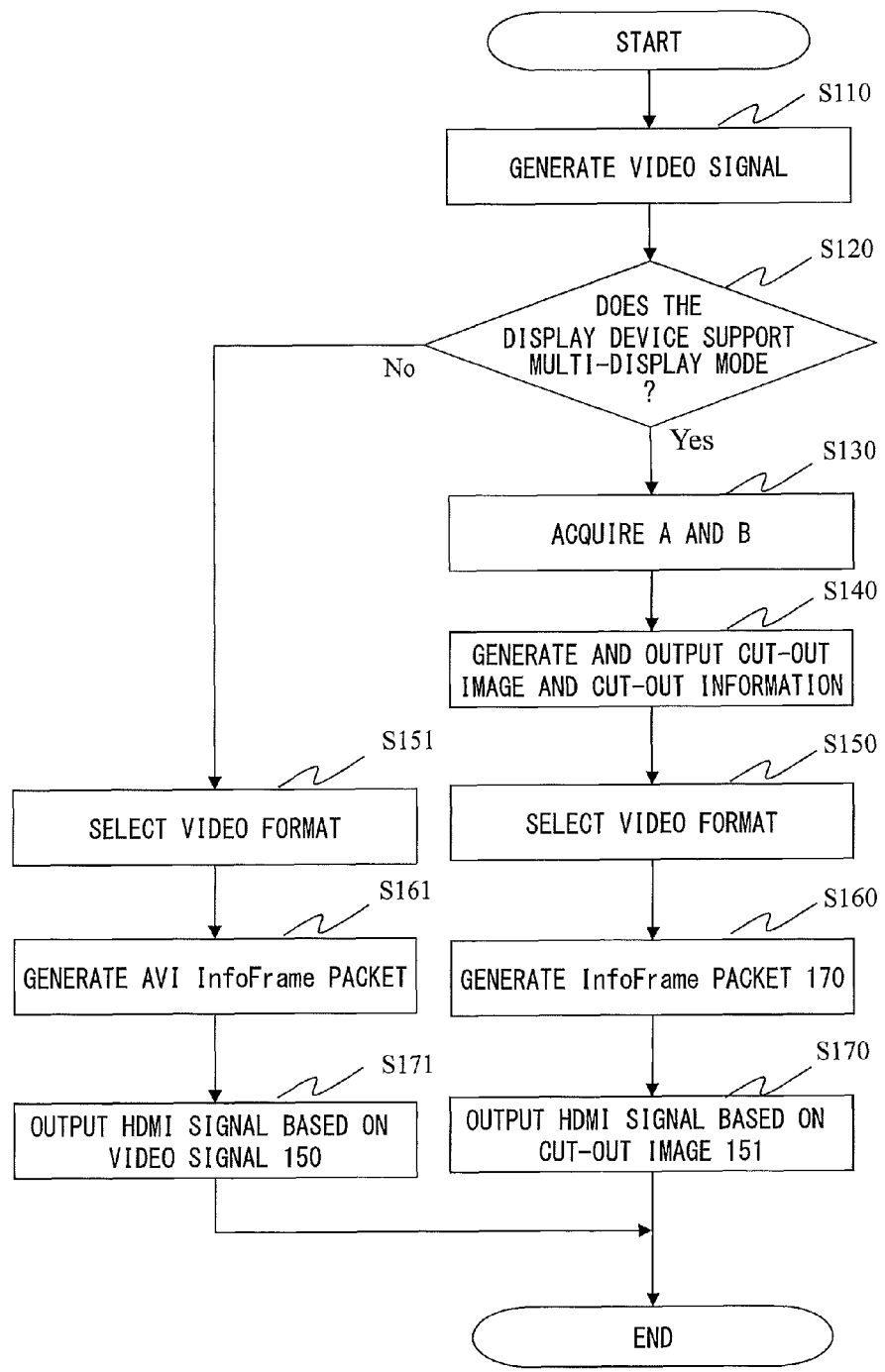
FIG. 6 is a flowchart showing a flow of operations by the output device according to the first embodiment of the present invention.

Next, operations of the output device 100 according to the present embodiment will be described. FIG. 6 is a flowchart showing a flow of the operations of the output device 100. First, the video signal processor 102 generates the video signal 150 (S110).

Next, the display capability capturer 101 captures the EDID from the display device 200, and refers to HDMI_Video_present and Multi_display_present in the EDID. Then, the display capability capturer 101 determines whether or not the display device 200 supports the multi-display mode (S120). Specifically, if HDMI_Video_present is 1 and Multi_display_present is 01 or 10 (both of which are binary numbers), the display capability capturer 101 determines that the display device 200 supports the multi-display mode (Yes at S120). Otherwise, the display capability capturer 101 determines that the display device 200 does not support the multi-display mode (No at S120).

When the display device supports the multi-display mode (Yes at S120), the display capability capturer 101 refers to Multi_Display_Horizontal_Size [15 . . . 0] and Multi_Display_Vertical_Size [15 . . . 0] of the EDID, and acquires the horizontal pixel number and the vertical pixel number of the display section 206. In addition, the horizontal pixel number A and the vertical pixel number B of the cutout image are acquired by also using the VIC, and, in some cases, also using the value of Multi_Display_MASK_i (S130) in combination.

Next, the difference detector 103 detects an inter-frame difference area of the video signal 150, and generates the cutout image 151 including the difference area. The horizontal pixel number and the vertical pixel number of this cutout image 151 are A and B acquired at S130. Furthermore, the difference detector 103 outputs the cutout image 151 and the cutout-area information 160 respectively to the HDMI transmitter 105 and the packet generator 104 (S140).

Next, the display capability capturer 101 refers to the EDID, and, when Multi_display_present is 10 (binary number), obtains the VIC that corresponding to a bit that is "1" in Multi_Display_MASK [15 . . . 0]. When Multi_display_present is 01 (binary number), the Video Data Block of the EDID is referred to, and the VICs supported by the display device 200 are obtained. Then, among the video formats corresponding to the VICs, the display capability capturer 101 selects one video format that is decodable by the HDMI transmitter 105 (S150). The selected video format is outputted to the packet generator 104 and the HDMI transmitter 105.

Then, the packet generator 104 generates the InfoFrame packet 170 including the AVI InfoFrame packet and the specific InfoFrame packet, based on the cutout-area information 160 and the selected video format (S160).

Then, the HDMI transmitter 105 encodes the cutout image 151 based on the video format selected by the display capability capturer 101. Next, the HDMI transmitter 105 superimposes, onto the encoded video signal, data of the InfoFrame packet 170 during either the horizontal blanking period or the vertical blanking period. Then, the HDMI transmitter 105 outputs, to the display device 200 as an HDMI signal, the video signal having superimposed thereon the data of the InfoFrame packet 170 (S170).

On the other hand, when the display device does not support the multi-display mode (No at S120), the display capability capturer 101 refers to the Video Data Block of the EDID, and obtains the VICs that are supported by the display device 200. Then, among the video formats corresponding to those VICs, the display capability capturer 101 selects one video format that is decodable by the HDMI transmitter 105 (S151).

Next, the packet generator 104 generates the AVI InfoFrame packet based on the selected video format (S161).

Then, the difference detector 103 outputs the video signal 150 to the HDMI transmitter 105 without performing any processes thereon, and the HDMI transmitter 105 encodes the video signal 150 based on the video format selected by the display capability capturer. Next, the HDMI transmitter 105 superimposes, onto the encoded video signal, data of the AVI InfoFrame packet during either the horizontal blanking period or the vertical blanking period. Then, the HDMI transmitter 105 outputs, to the display device 200, as an HDMI signal, the video signal having superimposed thereon the data of the InfoFrame packet 170 (S171).

Next, a configuration of the display device according to the present embodiment will be described. FIG. 7 is a block diagram showing a configuration of the display device (corresponding to a SINK in the HDMI ver. 1.3a specification) of the present embodiment. In FIG. 7, the display device 200 includes a display capability transmitter 201, the HDMI receiver 202, a packet analyzer 203, an image restorer 204, a memory 205, and the display section 206.

The display capability transmitter 201 transmits, to the output device 100, the EDID shown in FIG. 3, in accordance with a request from the display capability capturer 101. It should be noted that this EDID is configured to the display device 200 in advance at the time of shipment from a factory.

The HDMI receiver 202 separates the HDMI input signal into the cutout image 151 and the InfoFrame packet 170 that has been superimposed during the blanking period of the HDMI input signal, outputs the InfoFrame packet 170 to the packet analyzer 203, and outputs the cutout image 151 to the image restorer 204.

The packet analyzer 203 obtains the cutout-area information 160 from the InfoFrame packet 170. In addition, the packet analyzer 203 obtains a video format 180 regarding the cutout image 151 from the AVI InfoFrame packet in the InfoFrame packet 170. The packet analyzer 203 outputs these pieces of information to the image restorer 204.

The image restorer 204 refers to the cutout-area information 160, the cutout image 151, and the video signal 150 of the immediately preceding frame held by the memory 205, generates a video signal in which only an area associated with the cutout-area information 160 is updated, and outputs the generated video signal to the memory 205. Detailed operations of the image restorer 204 will be described later.

The memory 205 temporarily stores the video signal outputted from the image restorer 204, and displays a picture on the display section 206.

Figure 8:
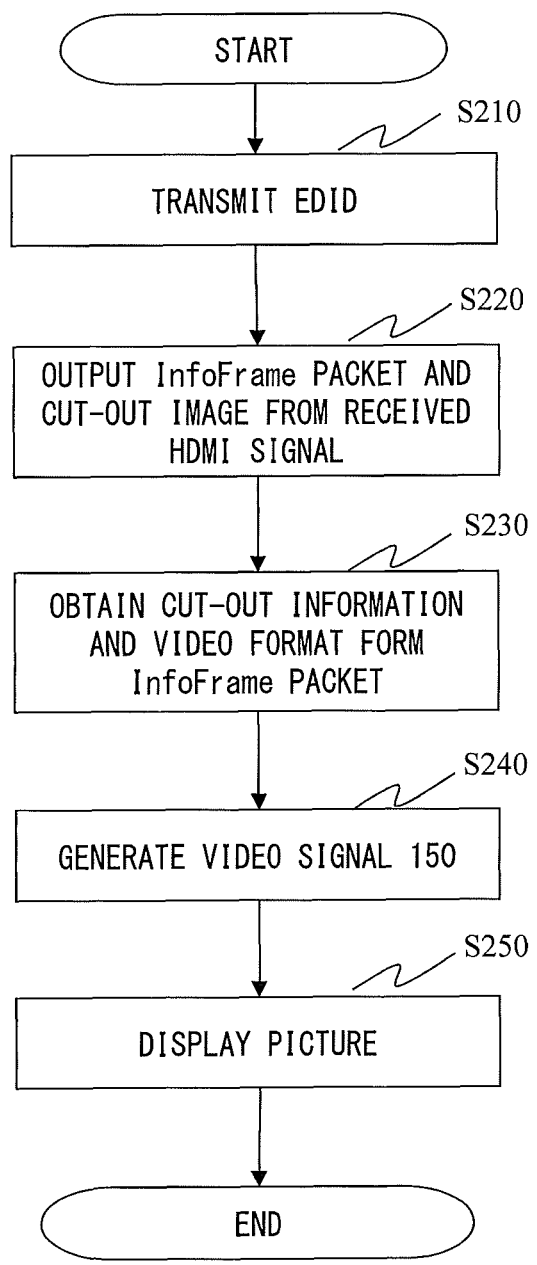
FIG. 8 is a flowchart showing a flow of operations of the display device according to the first embodiment of the present invention.

Next, operations of the display device 200 according to the present embodiment will be described. FIG. 8 is a flowchart showing a flow of the operations of the display device 200. First, the display capability transmitter 201 transmits, to the output device 100, the EDID in accordance with a request from the display capability capturer 101 (S210).

Then, the HDMI receiver 202 receives an HDMI signal from the output device 100, separates the received HDMI signal into the cutout image 151 and the InfoFrame packet 170, outputs the InfoFrame packet 170 to the packet analyzer 203, and outputs the image restorer 204 to the cutout image 151 (S220).

Next, the packet analyzer 203 obtains the cutout-area information 160 from the InfoFrame packet 170. Specifically, the horizontal pixel number A and the vertical pixel number B of the cutout image are obtained from the AVI InfoFrame packet, and cutout position (x, y) of the cutout image is obtained from the specific InfoFrame packet. Furthermore, the packet analyzer 203 obtains the video format 180 regarding the cutout image 151 from the AVI InfoFrame packet. The packet analyzer 203 outputs these pieces of information to the image restorer 204 (S230).

Then, the image restorer 204 refers to the video format 180, and converts the signal into a video signal that can be displayed by the display section 206. Next, with regard to the video signal 150 of the immediately preceding frame held by the memory 205 in advance, the image restorer 204 replaces, with an image of the cutout image 151, an image that has a horizontal pixel number of A and a vertical pixel number of B and whose upper left corner is at position (x, y). Then, the image restorer 204 generates the video signal 150 in which only an area associated with the cutout-area information 160 is updated, and outputs the generated video signal to the memory 205 (S240).

Then, the display section 206 displays the video signal 150 stored in the memory 205 (S250).

Next, advantageous effects of the present embodiment will be described. The display device 200 according to the present embodiment allows transmission of signals to the display section 206 having a high resolution without increasing the data rate transmitted on a transmission cable even when the included display section 206 has a high definition with a very large number of horizontal and vertical pixels, since the output device 100 has to transmit only the difference between the video signal of the immediately preceding frame and the video signal of the current frame. Therefore, the present embodiment can achieve transmission of signals of high resolution video pictures at a transmission rate that does not exceed an upper limit of the data transmission rate of the transmission cable.

Furthermore, in the present embodiment, by making maximal use of the existing frameworks of the InfoFrame and EDID, addition of cutout-area information required for representing a video-data structure is minimized. As a result, data in the EDID and InfoFrame are suppressed within capacity limits, and transmission of video signals supporting high resolution video pictures can be achieved through HDMI.

The VICs used in ordinarily transmission modes are ones for not using the "multi-display mode" in the display device 200. However, by utilizing Multi_Display_MASK, transferring of video signals can be achieved with the "multi-display mode" through HDMI, even in a case where the display device 200 "supports the multi-display mode" only for some of the VICs.

Figure 9:
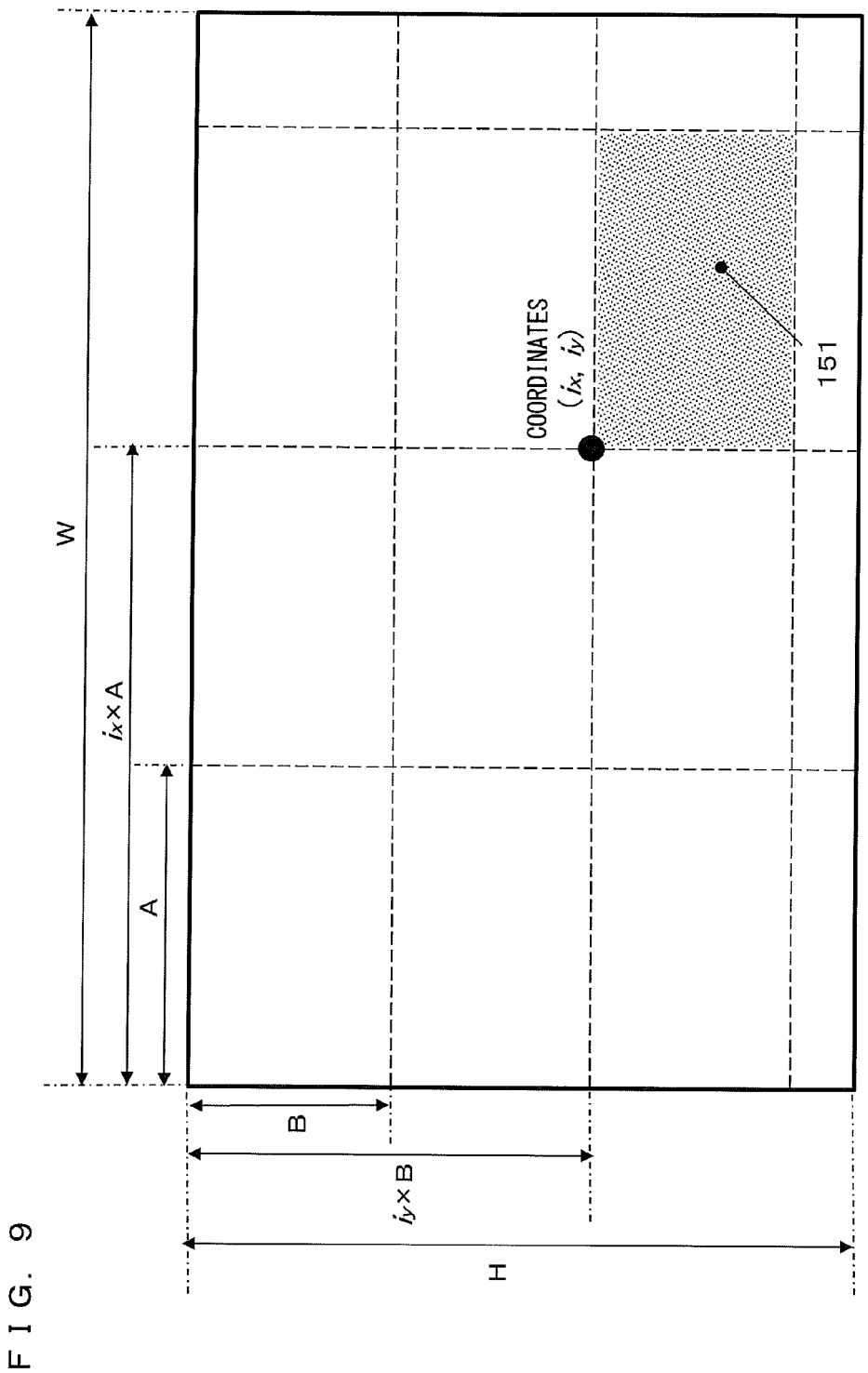
FIG. 9 shows one example of specifying a cutout position of a cutout image of the present invention.

It should be noted that, descriptions have been provided under a premise that the position of the upper left corner of the cutout image, which is described as the cutout-area information, is to be represented as (x, y) in pixel units; however, the position can be represented as follows if the premise is that the size of the cutout image 151 is constant as (A, B). As shown in FIG. 9, when the upper left corner of an image of a single frame is used as a reference and if the position of a cutout image that is to be cut out is defined using a position of (i×A, j×B) (i,j are integers equal to or larger than 0); instead of (x, y, A, B), ($i_x$, $i_y$, A, B) (wherein; $x=i_x×A$, $y=i_y×B$) can be used as the cutout-area information. In this case, cutout images located at the right end or the lower end of an image of a single frame may include, in one part thereof, an area that is not displayed on the display device 200. In such a case, the area of the cutout image not displayed on the display device 200 may be padded with a specific color such as black in order to maintain the size of the cutout image at a constant. It should be noted that the output device 100 can acquire the horizontal pixel number W and the vertical pixel number H of the display device 210 from Multi_Display_Horizontal_Size [15 . . . 0] and Multi_Display_Vertical_Size [15 . . . 0] of the EDID of the display device 200. Therefore, the output device 100 can use, as a maximum value of ix, a smallest ix that satisfies $i_x×A≥W$; and can use, as a maximum value of iy, a smallest iy that satisfies $i_y×B≥W$.

Furthermore, HDMI signals generated by the HDMI transmitter 105 generally require clock continuity. Therefore, even when there is no difference between the immediately preceding frame and the current frame, and thereby there is no picture areas to be updated, the output device 100 needs to output some HDMI signals at fixed time intervals in order to maintain the continuity of the HDMI signals. This certain period of time depends on the frequency of the clock signal of TMDS. In such a case, for example, the output device 100 may cut out some area within the current frame as the cutout image 151, and transmit an HDMI signal regarding the cutout image 151. Alternatively, the output device 100 may generate a dummy image as the cutout image 151, and transmit an HDMI signal in which the values of (x, y) of the cutout-area information 160 are set to a special value (for example, values larger than the horizontal size and vertical size of the video signal 150: these sizes may be values that uses the size of a cutout image as a reference as previously described, or may be values using pixel numbers as a reference); and the display device 200 may ignore that HDMI signal. Doing so has an advantageous effect of reducing the necessity of re-authentication through HDCP. The re-authentication through HDCP occurs when a picture has been interrupted or when a picture size etc., has been changed. In the present embodiment, there is no interruption in a picture since a digital video output signal is outputted at fixed time intervals even when there are no picture areas to be updated.

Second Embodiment

Figure 10:
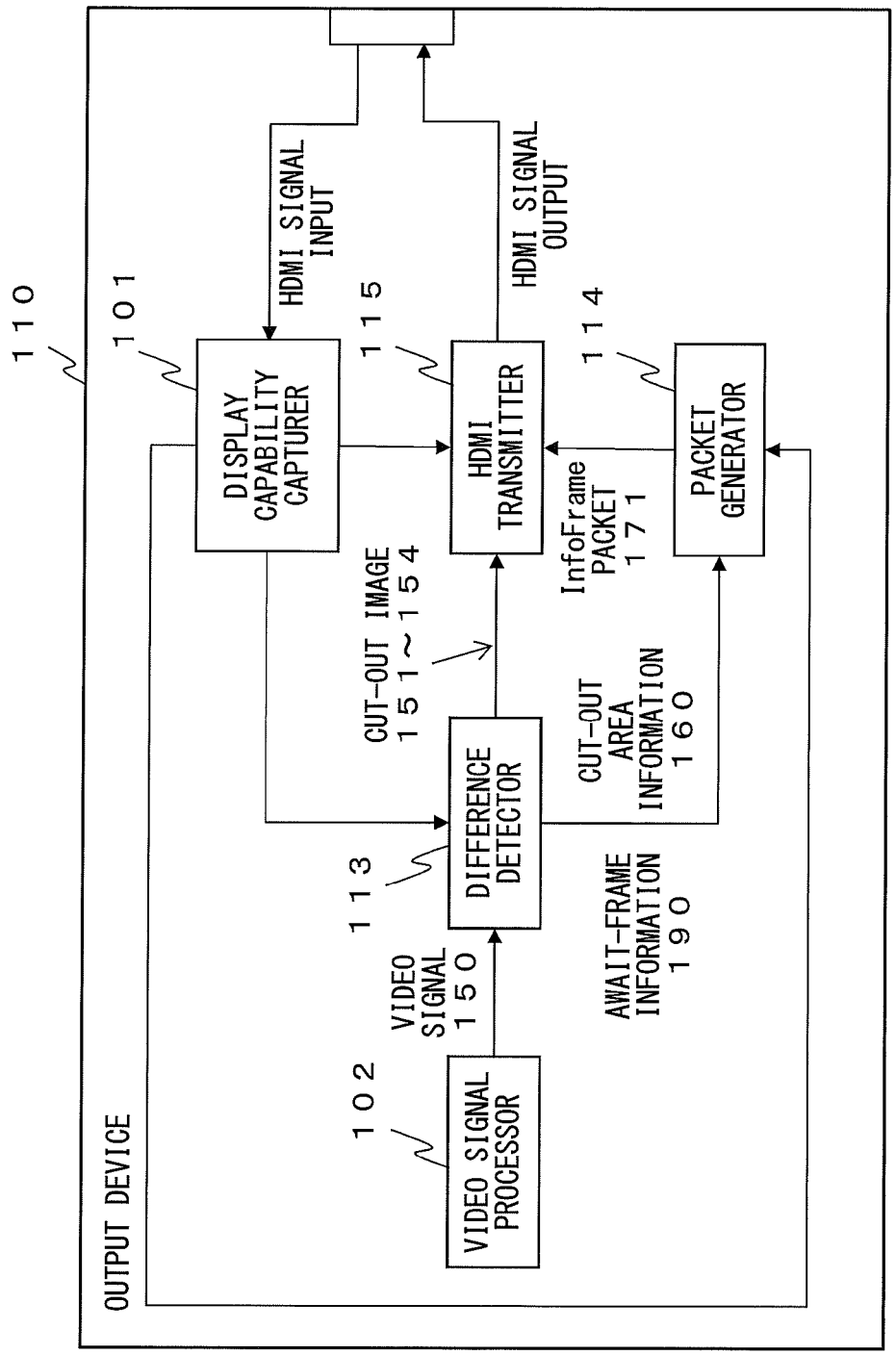
FIG. 10 is a block diagram of an output device according to a second embodiment of the present invention.

FIG. 10 is a block diagram showing a configuration of an output device according to a second embodiment of the present invention. With reference to FIG. 10, an output device 110 includes the display capability capturer 101, the video signal processor 102, a difference detector 113, a packet generator 114, and an HDMI transmitter 115. Among those, components that conduct operations identical to those in the first embodiment are given reference characters identical to those in FIG. 1, and descriptions of those components are omitted.

With regard to the output device 110 in the present embodiment, the output device 110 transmits multiple cutout images for a single frame when the difference detector 113 detects areas not as horizontal and vertical sizes of a single cutout image 151 but as multiple cutout images. In addition, await-frame information 190, having described therein a time point at which a display device 210 described later with FIG. 14 restore and displays an image of a single frame, is also transmitted in addition to the cutout-area information 160. With this, the output device 110 can transmit the video signal 150 to the display device 210 without changing the size of the cutout image.

The difference detector 113 detects a difference between an entire image of the current frame and the entire image of one frame immediately preceding that frame in the video signal 150. Then, when the difference detector 113 detects areas, not as horizontal and vertical sizes of a single cutout image but as multiple cutout images, the multiple cutout images are cut out. Next, the difference detector 113 outputs each of the cutout images to the HDMI transmitter 105. Described next is an example of a case where the difference detector 113 obtains the video signal 150 as shown in FIG. 11A, and a difference exists in areas of 151 to 154 in FIG. 11A. Here, 151 to 154 are respectively outputted to the HDMI transmitter 115 as cutout images 151 to 154.

Assumed here is a case where the horizontal sizes and vertical sizes of the cutout images 151 to 154 are respectively A number of pixels and B number of pixels as shown in FIG. 11B. In addition, the respective upper left corners of the cutout images 151 to 154 are $(i_{x1}, i_{y1})$ to $(i_{x4}, i_{y4})$ shown in FIG. 11A. It should be noted that $(i_{x1}, i_{y1})$ to $(i_{x4}, i_{y4})$ are not sizes in pixel units, but are values representing sizes using, as a reference, the horizontal size A and the vertical size B of the cutout image as shown in FIG. 9. In such a case, the difference detector 113 outputs, to the packet generator 114, $(i_{x1}, i_{y1}, A, B)$ to $(i_{x4}, i_{y4}, A, B)$ as the cutout-area information 160 associated with the cutout images 151 to 154.

In addition, the difference detector 113 outputs, to the packet generator 114, the await-frame information 190 that indicates the number of frames for which displaying and outputting of an image data are set on standby after receiving of the image data. In the example shown in FIG. 11B, when outputting to the HDMI transmitter is conducted in an order of the cutout image 151, the cutout image 152, the cutout image 153, and the cutout image 154; the await-frame numbers are respectively 3, 2, 1, and 0.

In addition to the cutout-area information 160, the packet generator 114 generates an InfoFrame packet 171 having added thereto the await-frame information 190. The await-frame information 190 is described in the specific InfoFrame packet that has been explained in the first embodiment. Details thereof will be described later using FIG. 12.

During blanking periods of the video signals of the cutout images 151 to 154, the HDMI transmitter 115 superimposes the cutout-area information 160 associated with each of the cutout images 151 to 154, and the InfoFrame packet 171 including the await-frame information 190. Then, the HDMI transmitter 115 transmits, to the display device 210, as an HDMI signal, a video signal having superimposed thereon data of the InfoFrame packet 171.

FIG. 12 shows the data format of the specific InfoFrame packet among the InfoFrame packet 171 according to the present embodiment. In the top row in FIG. 12, 0 . . . 7 each represents a bit number in each byte. Furthermore, in the leftmost column in FIG. 12, 0 . . . N each represents a byte number. In FIG. 12, values stored up to PB4 are identical to those in FIG. 5, and descriptions those values are omitted.

Two types of clock times are stored in CurrentTime: a reference clock-time (when the display device 210 receives the InfoFrame packet 171, the display device 210 set its own clock to the reference clock-time), and a clock time (display clock-time) at which a cutout image associated with the InfoFrame packet 171 is to be displayed. This clock time may be obtained by, for example, connecting multiple pieces of data representing hours, minutes, seconds, and milliseconds as two-byte texts. In this case, the number of bytes required for the CurrentTime is 16 bytes, and the CurrentTime is described in PB5 and beyond in FIG. 14 as 16-byte data. It should be noted that the above described representation method of the clock time is one example, and the exemplary embodiments are not limited to this method. Furthermore, the CurrentTime may exist in another independent InfoFrame packet.

"Offset" is one-byte information representing the await-frame information 190. The await-frame information 190 designates a frame number after which outputting is to be started, when the frame number is counted by a frame frequency of the VIC. When the value of the Offset is 0, it means outputting is to be started immediately. It should be noted that, when the reference clock-time and the display clock-time are described in the above described CurrentTime, the display device 210 can determine a time point at which the cutout image is to be displayed. Therefore, in this case, description of the Offset may be omitted. Conversely, even when the Offset is described, the display device 210 can determine a time point at which the cutout image is to be displayed. Therefore, in this case, description of the CurrentTime may be omitted.

Xposition is a four-bit value that is different from the Xposition [15 . . . 0] in FIG. 5 and whose one unit is the size of the horizontal pixel number A of a cutout image as shown in FIG. 9. Yposition is also a four-bit value that is different from Yposition [15 . . . 0] in FIG. 5 and whose one unit is the size of the vertical pixel number B of a cutout image as shown in FIG. 9. It should be noted that, values of A and B are defined by the horizontal pixel number and the vertical pixel number described by the AVI InfoFrame (for details, cf. Non-Patent Literature 2).

Figure 13:
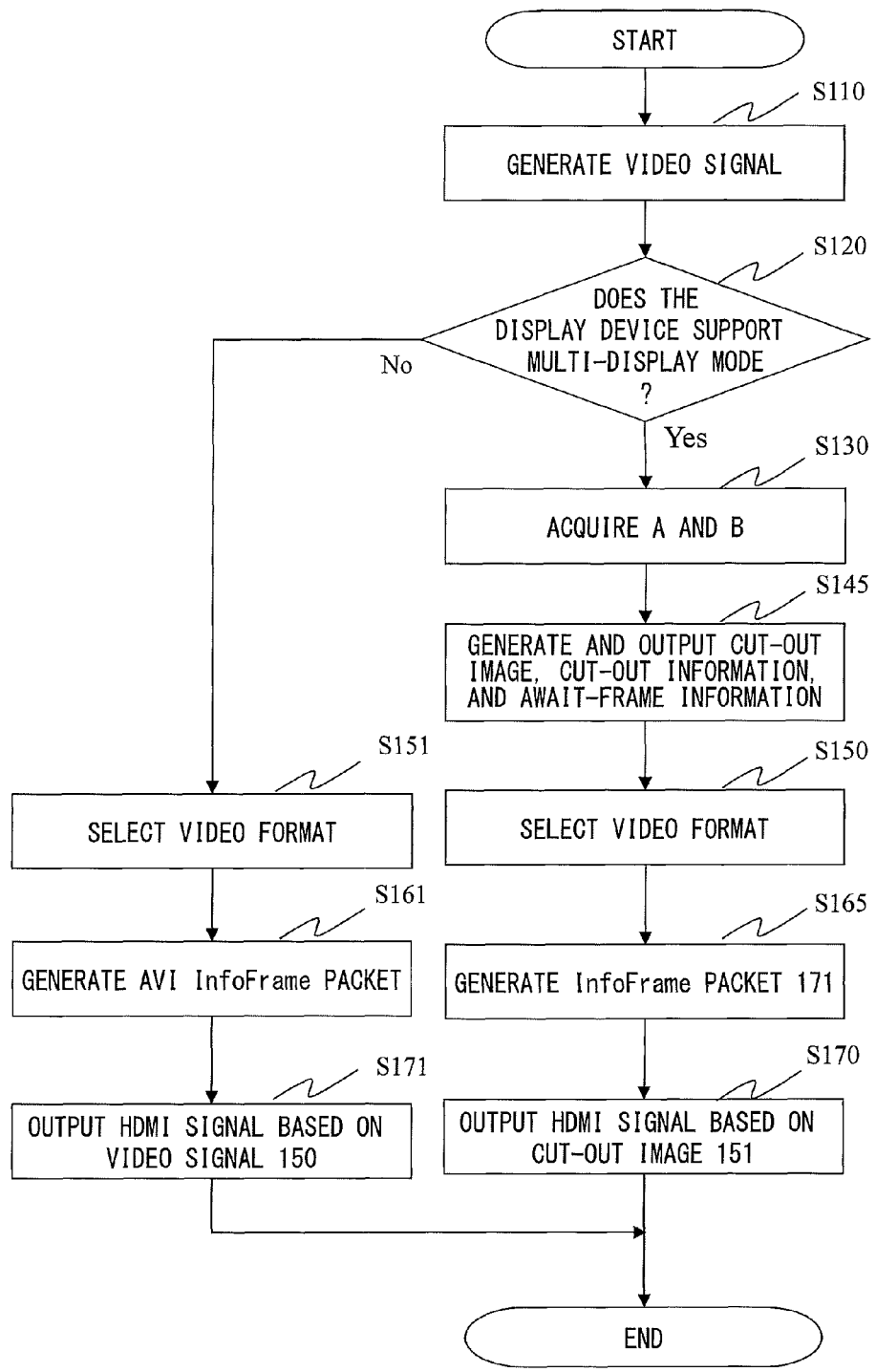
FIG. 13 is a flowchart showing a flow of operations of the output device according to the second embodiment of the present invention.

Next, operations of the output device 110 according to the present embodiment will be described. FIG. 13 is a flowchart showing a flow of the operations of the output device 110. In FIG. 13, operations identical to those in first embodiment are given reference characters identical to those in FIG. 6, and descriptions those operations are omitted.

After the display capability capturer acquires the horizontal pixel number A and the vertical pixel number B of the cutout image (S130), the difference detector 113 detects inter-frame difference areas of the video signal 150, and generates the cutout images 151 to 154 including the difference areas. Then, the difference detector 103 outputs the cutout images 151 to 154 to the HDMI transmitter 115. In addition, the difference detector 113 generates the await-frame information 190 and the cutout-area information 160 associated with the cutout images 151 to 154, and outputs the generated information to the packet generator 104 (S145).

Next, when a video format is selected by the display capability capturer 101 (S150), the packet generator 104 generates the InfoFrame packet 171 including the AVI InfoFrame packet and the specific InfoFrame packet, based on the cutout-area information 160, the await-frame information 190, and the selected video format (S165). The following operations are identical to those of the first embodiment.

Figure 14:
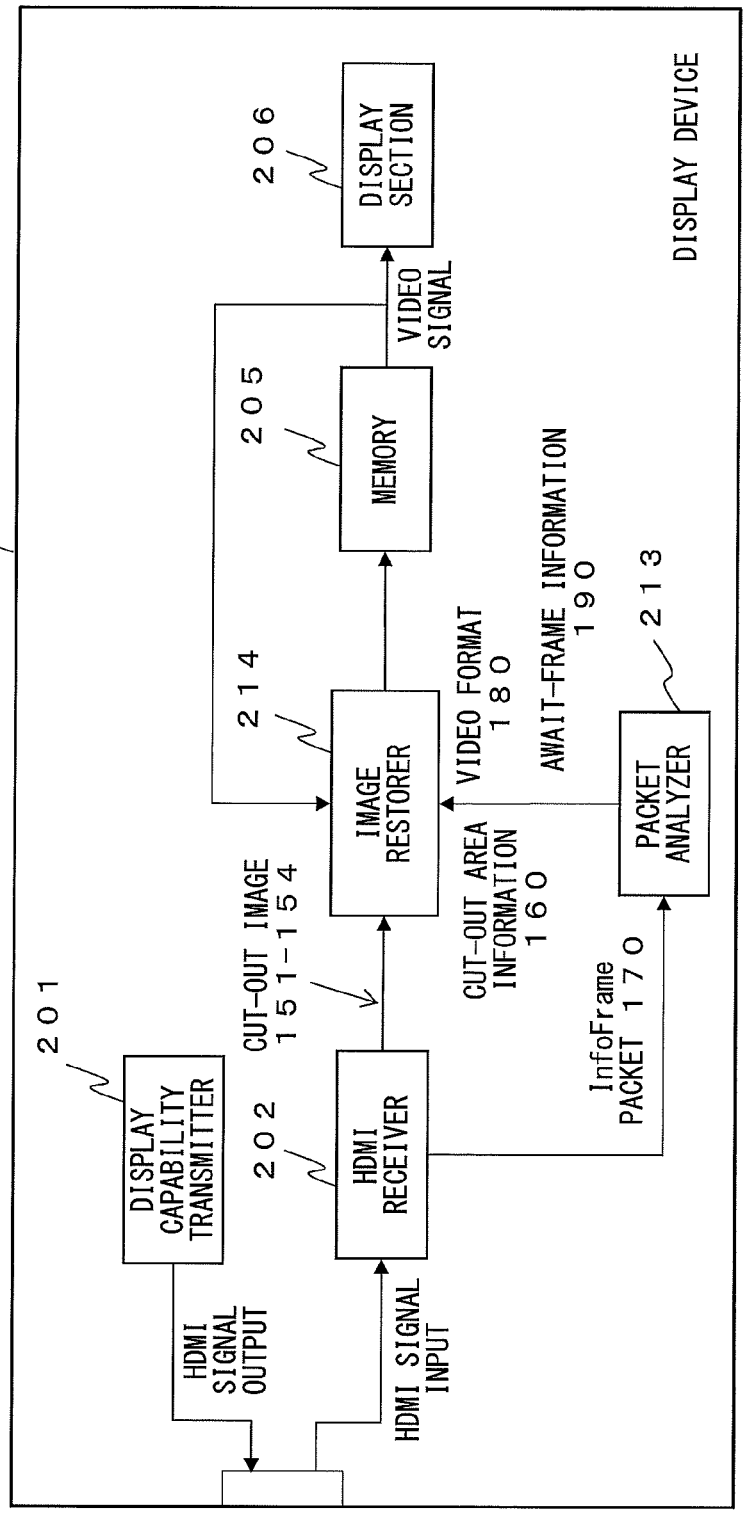
FIG. 14 is a block diagram of a display device according to the second embodiment of the present invention.

Next, a configuration of the display device according to the present embodiment will be described. FIG. 14 is a block diagram showing a configuration of the display device according to the present embodiment. In FIG. 7, the display device 200 includes the display capability transmitter 201, the HDMI receiver 202, a packet analyzer 213, an image restorer 214, the memory 205, and the display section 206. Among those, components that conduct operations identical to those in the first embodiment are given reference characters identical to those in FIG. 7, and descriptions of those components are omitted.

The packet analyzer 213 obtains, from the InfoFrame packet 171, the video format 180 regarding the cutout image and the cutout-area information 160. In addition, the packet analyzer 213 obtains the await-frame information 190 from the specific InfoFrame packet in the InfoFrame packet 171. The packet analyzer 203 outputs these pieces of information to the image restorer 204.

The image restorer 214 combines the video signal 150 and the cutout images 151 to 154. In particular, a characteristic of the image restorer 214 is to stand by for the number of frame defined by a value described in the await-frame information 190 before starting the outputting to the memory 205.

Figure 15:
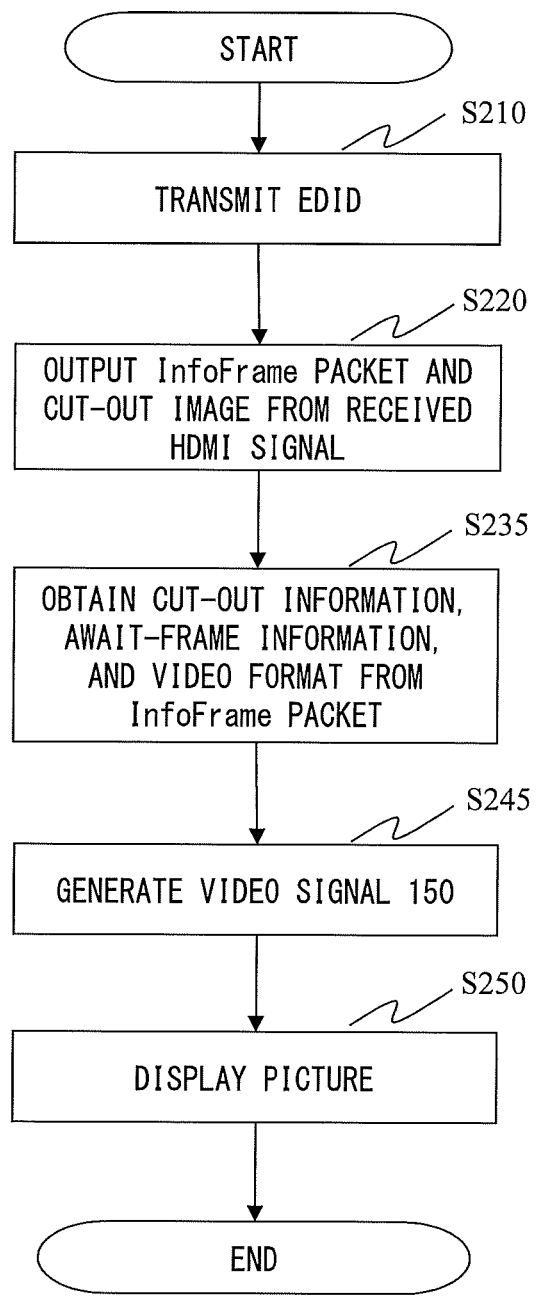
FIG. 15 is a flowchart showing a flow of operations of the display device according to the first embodiment of the present invention.

Next, operations of the display device 210 according to the present embodiment will be described. FIG. 15 is a flowchart showing a flow of the operations of the display device 210. In FIG. 15, operations identical to those in first embodiment are given reference characters identical to those in FIG. 8, and descriptions of those operations are omitted.

When the HDMI receiver 202 outputs the InfoFrame packet 171 to the packet analyzer 203 (S220), the packet analyzer 203 obtains the cutout-area information 160 and the video format from the InfoFrame packet 171. In addition, the packet analyzer 203 refers to the Offset in the specific InfoFrame packet and obtains the await-frame information 190. The packet analyzer 203 outputs these pieces of information to the image restorer 204 (S235).

Then, the image restorer 214 refers to the video format 180, and converts the signal into a video signal that can be displayed by the display section 206. Next, the image restorer 214 performs the replacement using the cutout image on the video signal 150 of the immediately preceding frame held by the memory 205 in advance. In doing so, the video signal 150 is not updated until the value of the Offset in the await-frame information becomes 0, and replacement is continuously performed using the cutout image. When the value of the Offset becomes 0, the image restorer 214 generates the video signal 150 in which only an area associated with the cutout-area information 160 is updated, and outputs the generated video signal to the memory 205 (S245). The following operations are identical to those of the first embodiment.

Next, advantageous effects of the present embodiment will be described. As shown in the example of FIGS. 11A and 11B, in order to generate an image of a single frame only after the display device 210 receives all the cutout images 151 to 154, the output device 110 of the present embodiment generates the await-frame information 190 including a different await-frame number for each of the cutout images 151 to 154. With this, it becomes possible to simultaneously update multiple areas without changing the sizes of the cutout images. Not changing the sizes of the cutout images means fluctuation does not occur in the clock values on a HDMI-signal transmission path. As described above, the re-authentication through HDCP occurs when a picture has been interrupted or when a picture size etc., has been changed. Therefore, the present embodiment has an advantage of not requiring re-authentication when being used in combination with an HDCP encryption method that is generally often used on an HDMI transmission path.

Furthermore, with the present embodiment, even when the display device 210 that is used has a large screen for displaying an image which has extremely large horizontal pixel numbers or vertical pixel numbers and which is in a video format that is not defined as the present VIC, the output device 110 divides the image into small images have small horizontal pixel numbers and vertical pixel numbers, and separately transmits the small images in several frames, thus allowing transmission through HDMI. For example, by transmitting, to the display device 210 for displaying an image of 6400×5400i, small images of 1280×1080i in 25 separate transmissions, the output device 110 can perform image transmission to the display device 210 through HDMI. Next, the output device 110 transmits an HDMI signal regarding the first small image whose await-frame number is 24, then sequentially transmits HDMI signals regarding other small images whose await-frame numbers are smaller by 1 compared a preceding image, and then transmits an HDMI signal regarding the last small image whose await-frame number is 0.

It should be noted that the size of such a small image and the manner in which they are divided are individually determined for every display device 210. Therefore, even when a display device 210 capable of displaying an image of 15000×10000i supports an image of 3000×2000i obtained by dividing the 15000×10000i image into five in the horizontal direction and five in the vertical direction; the display device 210 may not support an image of 1500×1000i obtained by dividing the 15000×10000i image into ten in the horizontal direction and ten in the vertical direction. In addition, there may be cases where a display device 210 capable of displaying an image of the above described same resolution supports both the above described 1500×1000i image and the above described 3000×2000i image.

In both the first embodiment and the second embodiment, the display device can also display a dynamic image only in the area of the cutout image 151 which is one part of the one screen, by having the output device not change the value of the cutout-area information 160, and transmitting a dynamic image having the size of the cutout image 151.

Third Embodiment

In the first and second embodiments, descriptions have been provided of a display device and a video signal output device for transmitting, as a video signal, a difference between frames in order to achieve high resolution video transmission without increasing the data rate of a transmission cable. In a third embodiment, descriptions will be provided for a display device and an output device of a video signal regarding a three-dimensional picture. The video signal regarding a three-dimensional picture refers to video signals obtained by combining, as a video signal of a single frame, two video signals, one for the left eye and one for the right eye.

Figure 16:
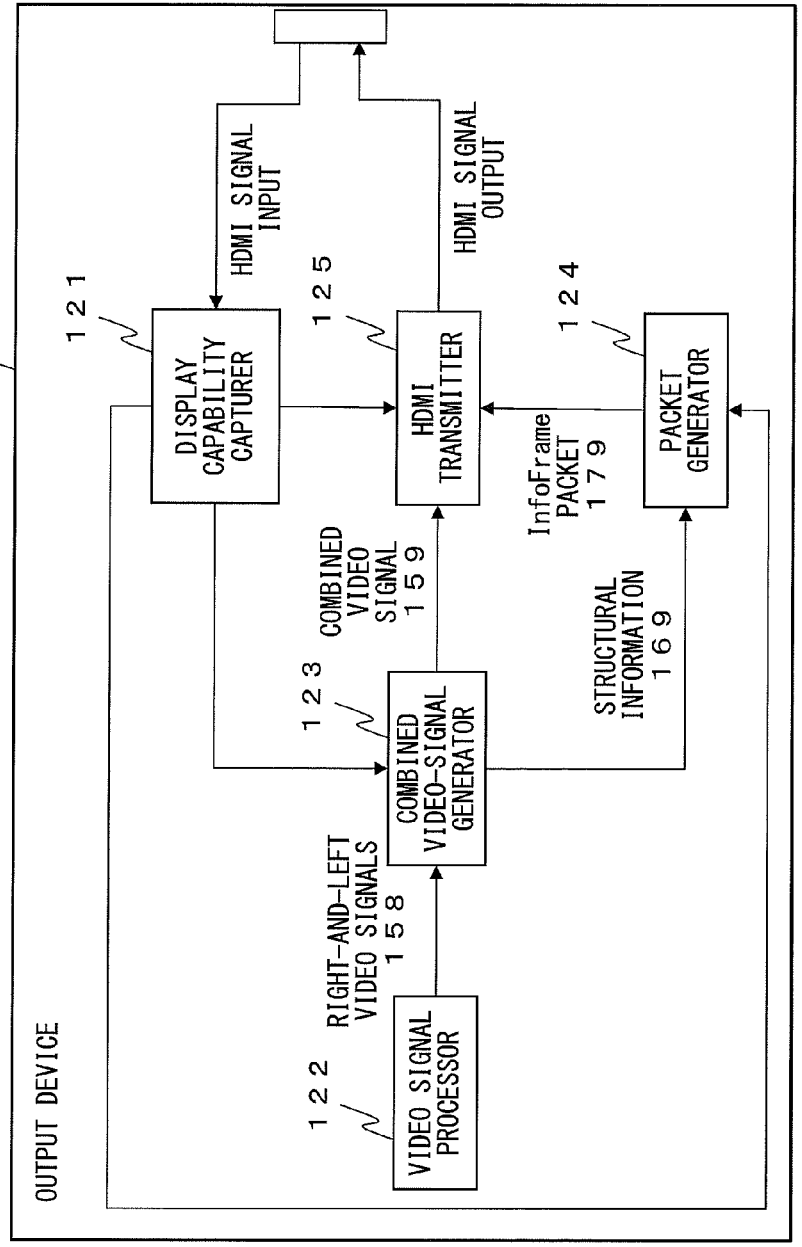
FIG. 16 is a block diagram of an output device according to a third embodiment of the present invention.

In the following, the third embodiment of the present invention will be described with reference to the drawings. FIG. 16 is a block diagram showing a configuration of an output device according to the third embodiment of the present invention. As shown in FIG. 16, an output device 120 includes a display capability capturer 121, a video signal processor 122, a packet generator 124, and an HDMI transmitter 125.

Figure 24:
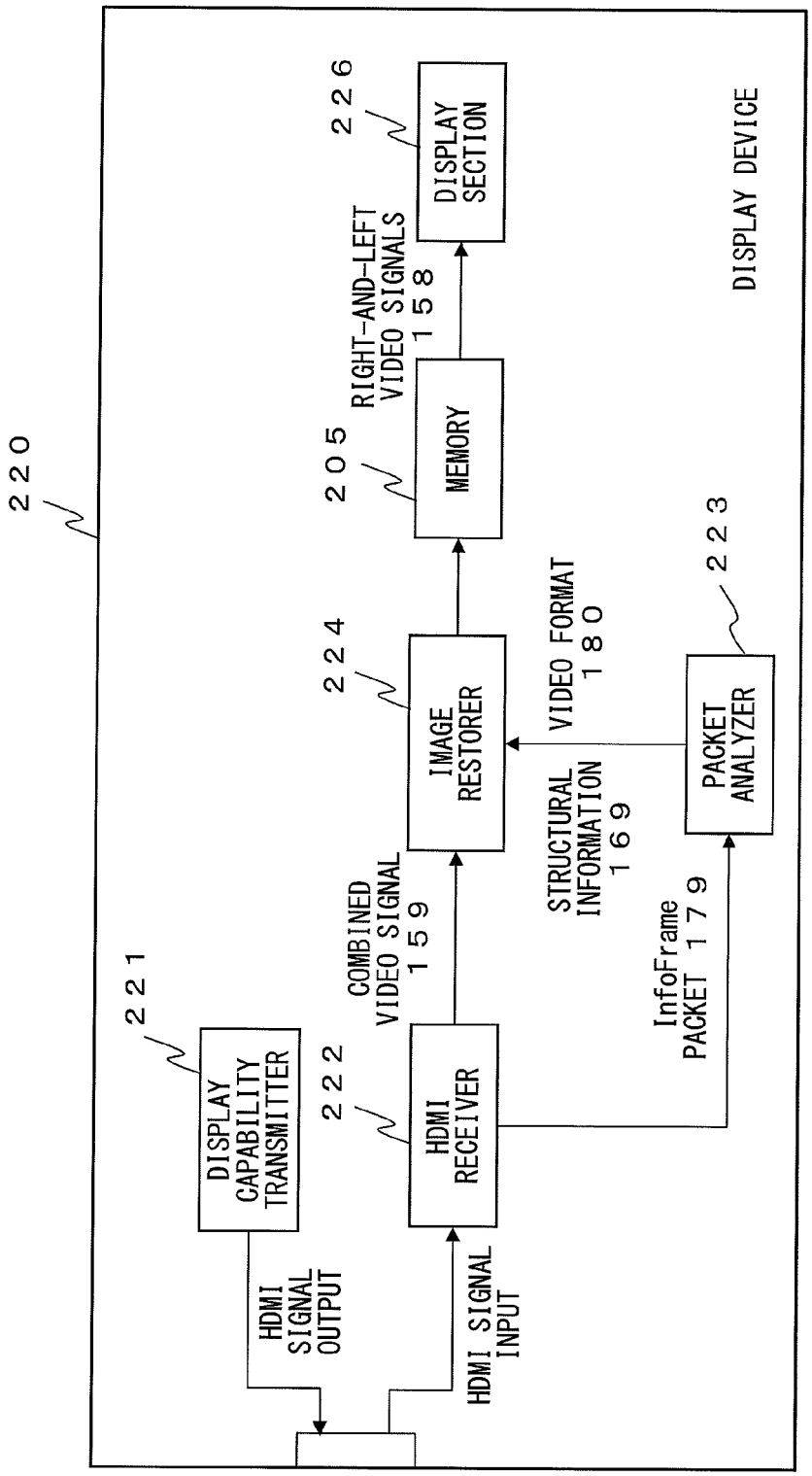
FIG. 24 is a block diagram of the display device according to the third embodiment of the present invention.

The display capability capturer 121 captures EDID from the display device 220 which is described later using FIG. 24. In the EDID, other than video formats (resolution, field rate, aspect ratios of images and pixels, etc.,) that are supported by the display device 220, a video-data structure (3D format) of three-dimensional pictures that can be received and displayed on the display device 200 is described. Details of the EDID will be described later using FIG. 21.

The video signal processor 122 generates video signals 158 for the left eye and the right eye, and outputs them to a combined video-signal generator 123.

The combined video-signal generator 123 generates, using the right-eye and left-eye video signals 158, a combined video signal 159 containing both video data in a video signal of a single frame. With regard to 3D formats of the combined video signal 159, there are four formats (details of these formats are described later) shown in FIG. 17 to FIG. 20.

Based on the EDID captured by the display capability capturer 121, the combined video-signal generator 123 selects one 3D format in which the display device 200 can receive and display, and generate the combined video signal 159 based on the format. Then, the combined video-signal generator 123 outputs the combined video signal 159 to the HDMI transmitter 125. In addition, the combined video-signal generator 123 outputs the 3D format used for generating the combined video signal 159 to the packet generator 124 as structural information 169.

Figure 17:
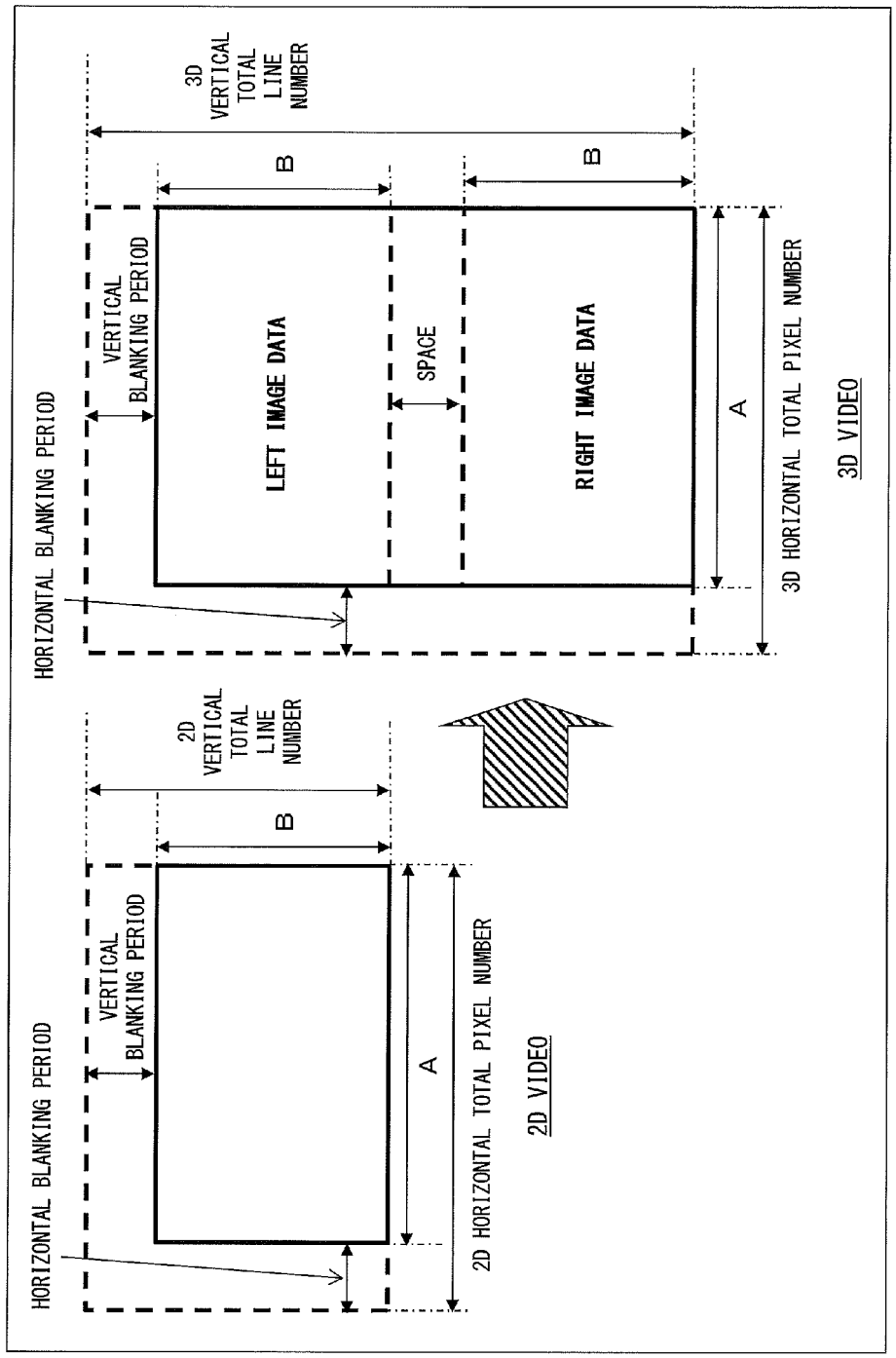
FIG. 17 is for describing one example of a three-dimensional video signal in the third embodiment of the present invention.

FIG. 17 is for describing a frame packing structure of a progressive image, which is one example of the above described 3D format. The left side of FIG. 17 shows one example of a digital video signal regarding an original video signal 158 for the left eye or the right eye. Similar to the signal in FIG. 4, this signal has a horizontal blanking period and a vertical blanking period opened up for transmitting the InfoFrame packet, and a remaining video-data period. In addition, the horizontal pixel number is A and the vertical pixel number (vertical line number) is B for the image data transmitted during the video-data period. Here, with regard to the video signal on the left side, a sum of the horizontal pixel number A and the number of pixels during the horizontal blanking period is defined as a 2D horizontal total pixel number. Furthermore, a sum of the vertical line number B and the number of lines during the vertical blanking period is defined as a 2D vertical total line number.

The right side of FIG. 17 shows a video signal in the frame packing structure obtained by combining two of the video signals as shown in the left side of FIG. 17. The frame packing structure is created by increasing the total line numbers by two times, when compared to a video signal for one eye. In this case, the HDMI transmitter 125 transmits left image data which is image data for the left eye, then transmits a certain amount of space, and transmits right image data which is image data for left eye. The number of lines of space between the left image data and the right image data is identical to the number of lines in the vertical blanking period. Therefore, in the video signal on the right side, a 3D vertical total line number obtained by adding the number of lines in the video-data period to the number of lines in the vertical blanking period is two times of the 2D vertical total line number. Furthermore, in the video signal on the right side, a 3D horizontal total pixel number obtained by adding the horizontal pixel number A to the number of pixels in the horizontal blanking period is equal to the 2D horizontal total pixel number.

Figure 18:
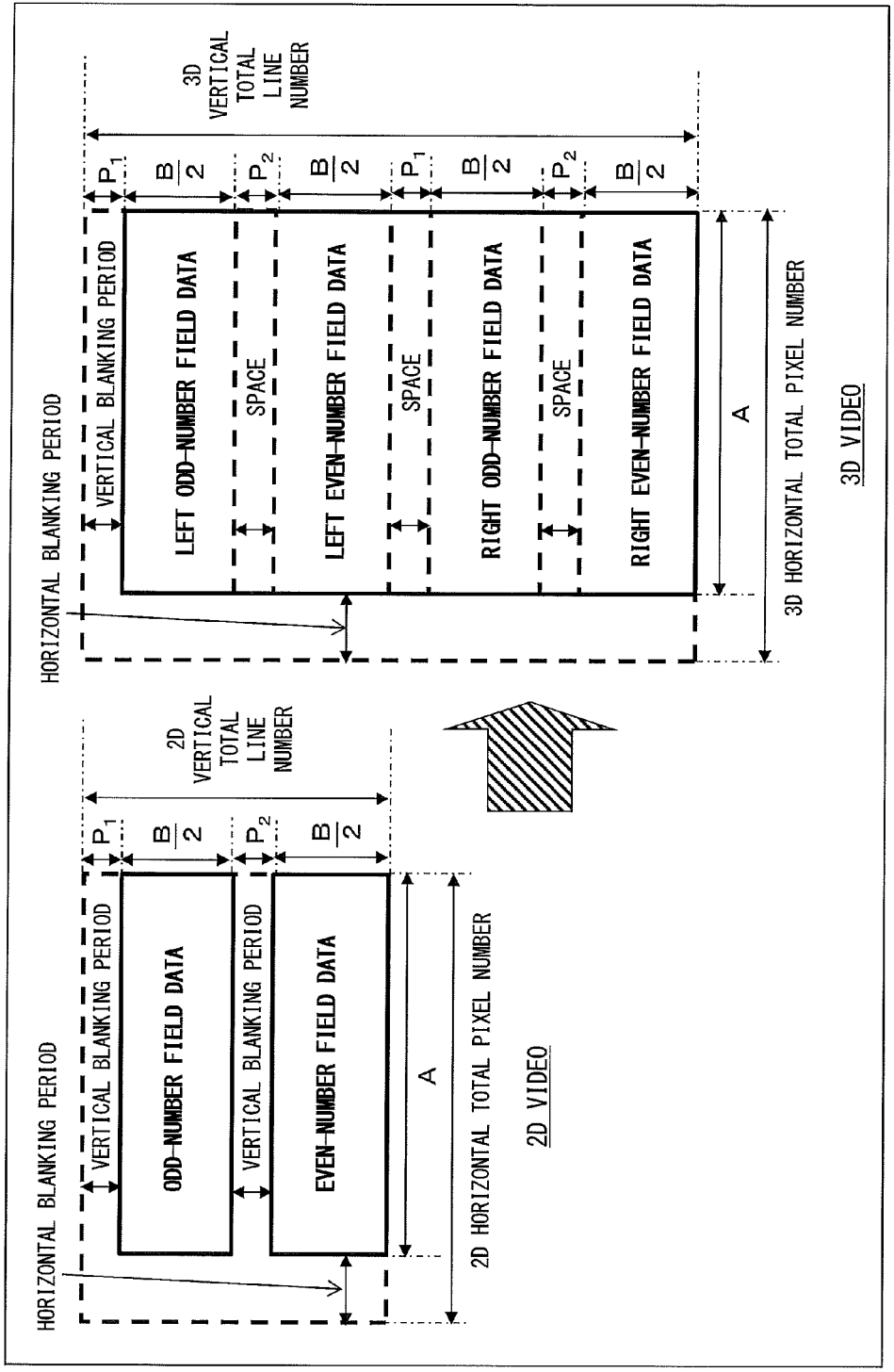
FIG. 18 is for describing one example of the three-dimensional video signal in the third embodiment of the present invention.

FIG. 18 is for describing a frame packing structure of an interlaced image, which is another one example of the 3D format described above. The left side of FIG. 18 shows one example of a digital video signal regarding the original video signal 158 for the left eye or the right eye. In this signal, the number of lines for odd-number field data and even-number field data is B/2, which is half of the image data in FIG. 17. In addition, the vertical blanking periods shown in two parts on the left side in FIG. 18 are formed with almost identical line numbers P1 and P2, and these line numbers do not necessary match the number of lines in the vertical blanking period shown in FIG. 17.

The right side of FIG. 18 shows a video signal in the frame packing structure obtained by combining two of the video signals as shown in the left side of FIG. 18. The frame packing structure is created by increasing the total line numbers by two times, when compared to a video signal for one eye. In this case, the HDMI transmitter 125 transmits left odd-number field data which is one part of the image data for left eye, then transmits a certain amount of space, and transmits left even-number field data. Then, the HDMI transmitter 125 transmits a certain amount of space, and, similarly for an image for the right eye, transmits right odd-number field data, space, and right even-number field data. P2 is used as the number of lines of the space between the left odd-number field data and the left even-number field data, and the number of lines of the space between the right odd-number field data and the right even-number field data. P1 is used as the number of lines of the space between the left even-number field data and the right odd-number field data. Therefore, in the video signal on the right side, the 3D vertical total line number obtained by adding the number of lines in the video-data period to the line number P1 in the vertical blanking period is two times of the 2D vertical total line number. Furthermore, in the video signal on the right side, the 3D horizontal total pixel number obtained by adding the horizontal pixel number A to the number of pixels in the horizontal blanking period is equal to the 2D horizontal total pixel number.

Figure 19:
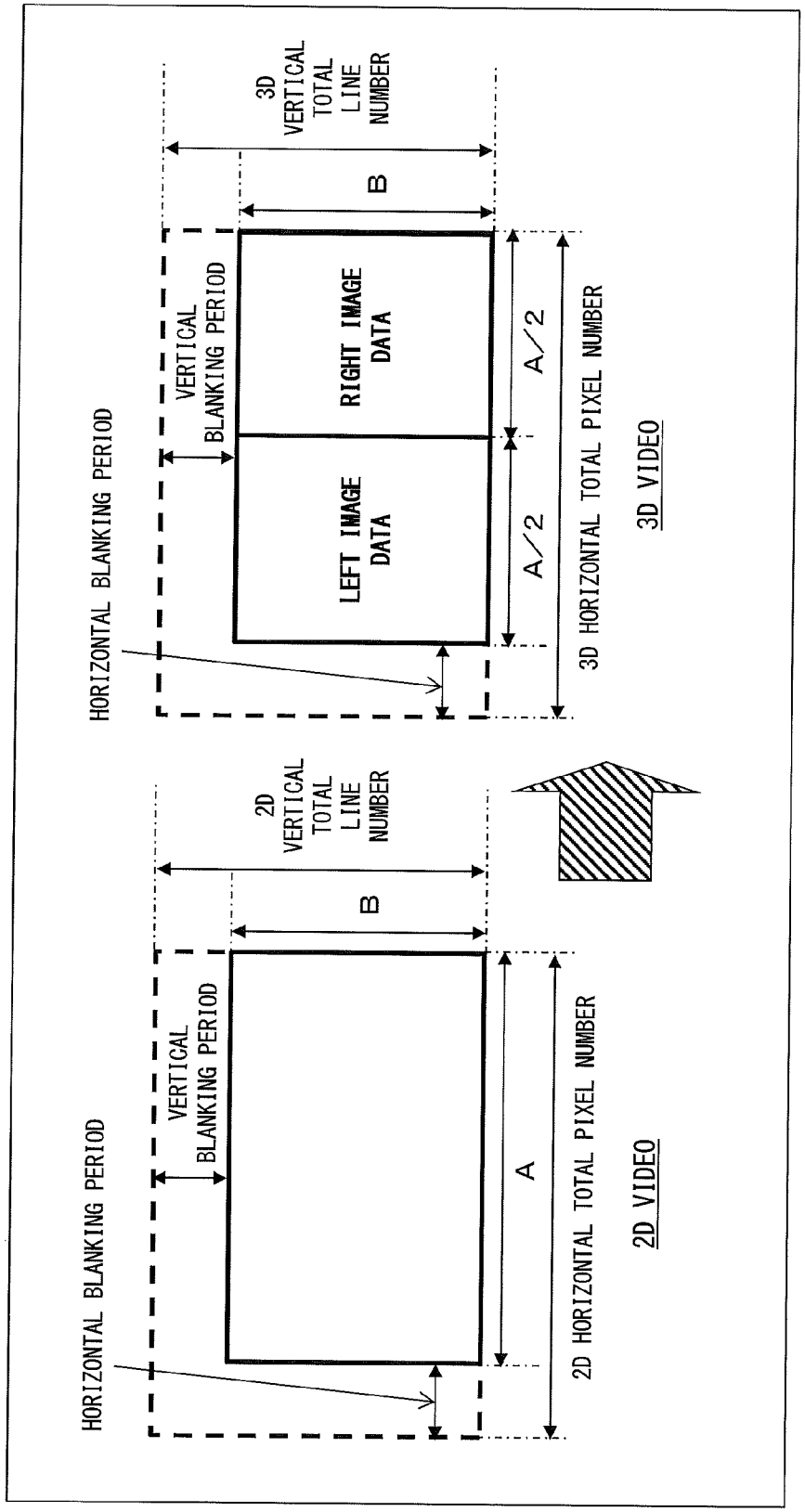
FIG. 19 is for describing one example of the three-dimensional video signal in the third embodiment of the present invention.

FIG. 19 is for describing a Side-by-Side structure, which is another one example of the above described 3D format. The left side of FIG. 19 shows one example of a digital video signal regarding the original video signal 158 for the left eye or the right eye, which is a signal identical to that on the left side of FIG. 17. The right side of FIG. 19 shows a video signal which is in the Side-by-Side structure and obtained by combining two video signals a shown on the left side of FIG. 19. The Side-by-Side structure is created by combining the left image data and the right image data in the horizontal direction. The left image data and the right image data are sub-sampled such that their resolutions in the horizontal direction are half when compared to a video signal for one eye. Therefore, the horizontal pixel number for each of the image data is A/2. In this case, the video signals on the left and right sides of FIG. 19 are equal regarding the number of pixels in the horizontal blanking period, the number of lines in the vertical blanking period, the horizontal total pixel number, and the vertical total line number.

Figure 20:
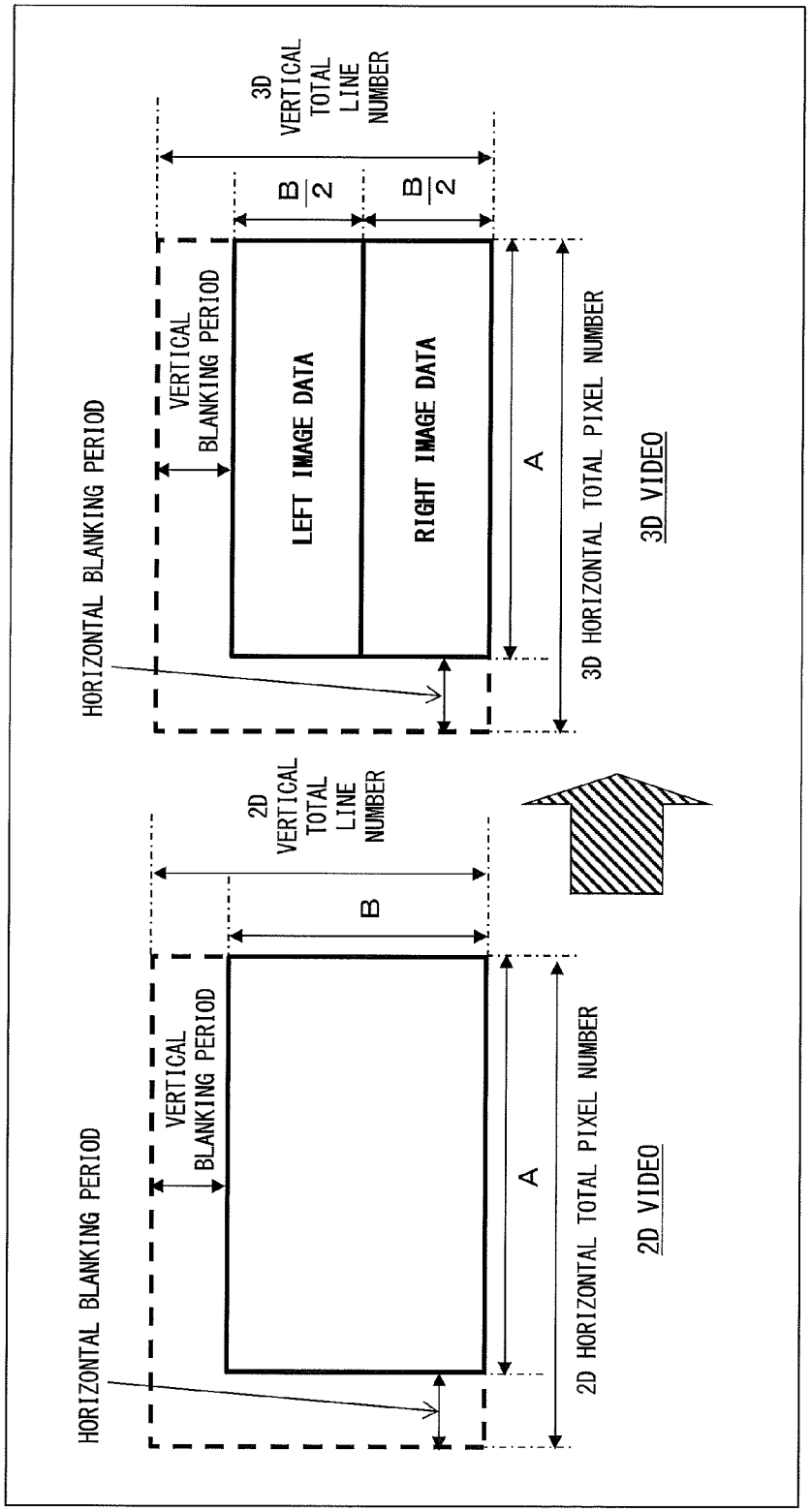
FIG. 20 is for describing one example of the three-dimensional video signal in the third embodiment of the present invention.

FIG. 20 is for describing a Top-and-Bottom structure, which is another one example of the above described 3D format. The left side of FIG. 20 shows one example of a digital video signal regarding the original video signal 158 for the left eye or the right eye, which is a signal identical to that on the left side of FIG. 17. The right side of FIG. 20 shows a video signal in the Top-and-Bottom structure obtained by combining two of the video signals as shown in the left side of FIG. 20. The Top-and-Bottom structure is created by combining the left image data and the right image data in the vertical direction. The left image data and the right image data are sampled such that their resolutions in the vertical direction are half when compared to a video signal for one eye. Therefore, the vertical pixel number (vertical line number) of each of the image data is B/2. In this case, the video signals on the left and right sides of FIG. 20 are equal regarding the number of pixels in the horizontal blanking period, the number of lines in the vertical blanking period, the horizontal total pixel number, and the vertical total line number.

The packet generator 124 converts the structural information 169 outputted by the combined video-signal generator 123 into an InfoFrame packet 179 that is transmitted during a flyback period of an HDMI signal, and outputs the signal to the HDMI transmitter 125. The InfoFrame packet 179, which is described later in detail using FIG. 21, includes a specific InfoFrame packet that is different from the specific InfoFrame packet in the first and second embodiments.

The HDMI transmitter 125 generates an HDMI signal as shown in FIG. 4 by using the combined video signal 159 from the combined video-signal generator 123 and the InfoFrame packet 179 from the packet generator 124. Then, the HDMI transmitter 125 transmits the generated HDMI signal from a TMDS channel.

It should be noted that, the HDMI transmitter 125 transmits the HDMI signal to the display device 220 only when the EDID captured by the display capability capturer 121 is "a case where the display device 220 can receive and display an HDMI signal regarding a three-dimensional picture" (hereinafter, for convenience of description, such a case is referred to as "a case where 3D mode is supported," and a display method for the three-dimensional picture is referred to as "3D mode").

FIG. 21 shows a data format in connection with EDID extension portions for HDMI vendor use, according to the present embodiment. In the top row in FIG. 21, 0 . . . 7 each represents a bit number in each byte. Furthermore, in the leftmost column in FIG. 21, 0 . . . N each represents a byte number. In FIG. 21, except for HDMI_Video_present in the eighth byte, values stored up to the twelfth byte are values defined based on the HDMI ver. 1.3a specification, and descriptions thereof are omitted in the present embodiment since details of those are disclosed in Non-Patent Literature 1.

The HDMI_Video_present is a one-bit value having described therein whether or not extended fields in the thirteenth byte and beyond in FIG. 21 are to be used. In the present embodiment, HDMI_Video_present is 1.

Stored in 3D_present in the thirteenth byte in FIG. 21 is a one-bit value representing whether or not the display device 220 supports the 3D mode. When this value is 0, the display device 220 does not support the 3D mode. Furthermore, when this value is 1, the display device 220 supports the 3D mode and supports a predetermined video format for three-dimensional pictures.

A two-byte value is stored in 3D_Multi_present in the thirteenth byte in FIG. 21. The following information is indicated when this value is 00, 01, 10, or 11 (all of which are binary numbers).
00: Video format and 3D format supported by the display device 220 are not described in the fifteenth byte or beyond in a predetermined format (3DStructureALL or 3DMASK).
01: 3D format supported by the display device 220 is described in the fifteenth byte and beyond in a predetermined format (3DStructureALL).
10: Video format and 3D format supported by the display device 220 are described in the fifteenth byte and beyond in a predetermined format (3DStructureALL and 3DMASK).
11: Reserved.

In FIG. 21, HDMI 3D_LEN at the fourteenth byte is a five-bit value specifying the number of bytes included in data formed from 3DStructureALL_[15 . . . 0], 3DMASK_[15 . . . 0], and 2DVICOrder_i ("i" is an integer from 1 to L). The magnitude of L is determined by the number of bytes specified by HDMI_3D_LEN.

3DStructureALL_[15 . . . 0] represents the following information when a value of a bit described in the following is 1.
3DStructureALL_0: The display device 220 supports video signals having the frame packing structure.
3DStructureALL_6: The display device 220 supports video signals having the Top-and-Bottom structure.
3DStructureALL_15: The display device 220 supports video signals having the Side-by-Side structure.
3DStructureALL_1 to 5, 7 to 14: Reserved When the values in each bit of 3DMASK_j ("j" is an integer from 0 to 15) are 1, the display device 220 supports a video format corresponding to a VIC described in the j-th Video Data Block of the EDID.

Here, when 3D_Multi_present is 01 (binary number), the display device 220 supports 3D formats corresponding to bits whose values are 1 in 3DStructureALL_[15 . . . 0] for video formats corresponding to all VICs described by the Video Data Block of the EDID. Furthermore, when 3D_Multi_present is 10 (binary number), the display device 220 supports a combination of a video format corresponding to a bit whose value is 1 in 3DMASK_[15 . . . 0] and a 3D format corresponding to a bit whose value is 1 in 3DStructureALL_[15 . . . 0].

2DVICOrder_i ("i" is an integer from 1 to L) is a four-bit value specifying a VIC supported by the display device 220 for displaying three-dimensional pictures. For example, in a case of 0000 (binary number), a VIC described in the first Video Data Block of the EDID is supported; and in a case of 1111 (binary number), a VIC described in the sixteenth is supported.

2DVICOrder_i ("i" is an integer from 1 to L) is a four-bit value specifying a VIC supported by the display device 220 for displaying three-dimensional pictures. For example, in a case of 0000 (binary number), a VIC described in the first Video Data Block of the EDID is supported; and in a case of 1111 (binary number), a VIC described in the sixteenth is supported.

3DStructure_i ("i" is an integer from 1 to L) is a four-bit value specifying a 3D format supported by the display device 220 for displaying three-dimensional pictures. When this value is 0000 to 1111 (all of which are binary numbers), the following structures are indicated.
0000: Frame packing
0110: Top-and-Bottom
1000: Side-by-Side
0001 to 0101, 1001 to 1111: Reserved 3DDetail_i ("i" is an integer from 1 to L) is a four-bit value specifying display parameters for three-dimensional images, when 3DStructure_i ("i" is an integer from 1 to L) is equal to or larger than 1000. When this four-bit value is 0000 to 1111 (all of which are binary numbers), the following structures are indicated.
0000: No special process is conducted.
0001: Sub-sampling is conducted in the horizontal direction.
0001 to 1111: Reserved It should be noted that, in Reserved(0) which has four bits and is subsequent to 3DDetail_i ("i" is an integer from 1 to L), 0000 (binary number) is stored only when 3DStructure_i ("i" is an integer from 1 to L) is equal to or larger than 1000.

Next, details of the InfoFrame packet 179 will be described. FIG. 22 shows a data format of the specific InfoFrame packet in the InfoFrame packet 179 according to the present embodiment. In the top row in FIG. 22, 0 . . . 7 each represents a bit number in each byte. Furthermore, in the leftmost column in FIG. 22, 0 . . . N each represents a byte number. In FIG. 22, values stored up to PB3 are values defined based on the HDMI ver. 1.3a specification, and details thereof are disclosed in Non-Patent Literature 1 and Non-Patent Literature 2 and thereby descriptions of those are omitted in the present embodiment.

HDMI_Video_Format is a value specifying whether or not a video-data structure other than the video format is supported, and when the value is a specific value (e.g., 010 in binary numbers), it indicates that the display device 220 "supports the 3D mode." Reserved(0) represents a bit reserved for extension, and 0 is described therein.

3DStructure is a four-bit value specifying a 3D format transmitted during the video-data period of the HDMI signal. This value is identical to 3DStructure_i ("i" is an integer from 1 to L) in FIG. 21.

Figure 23:
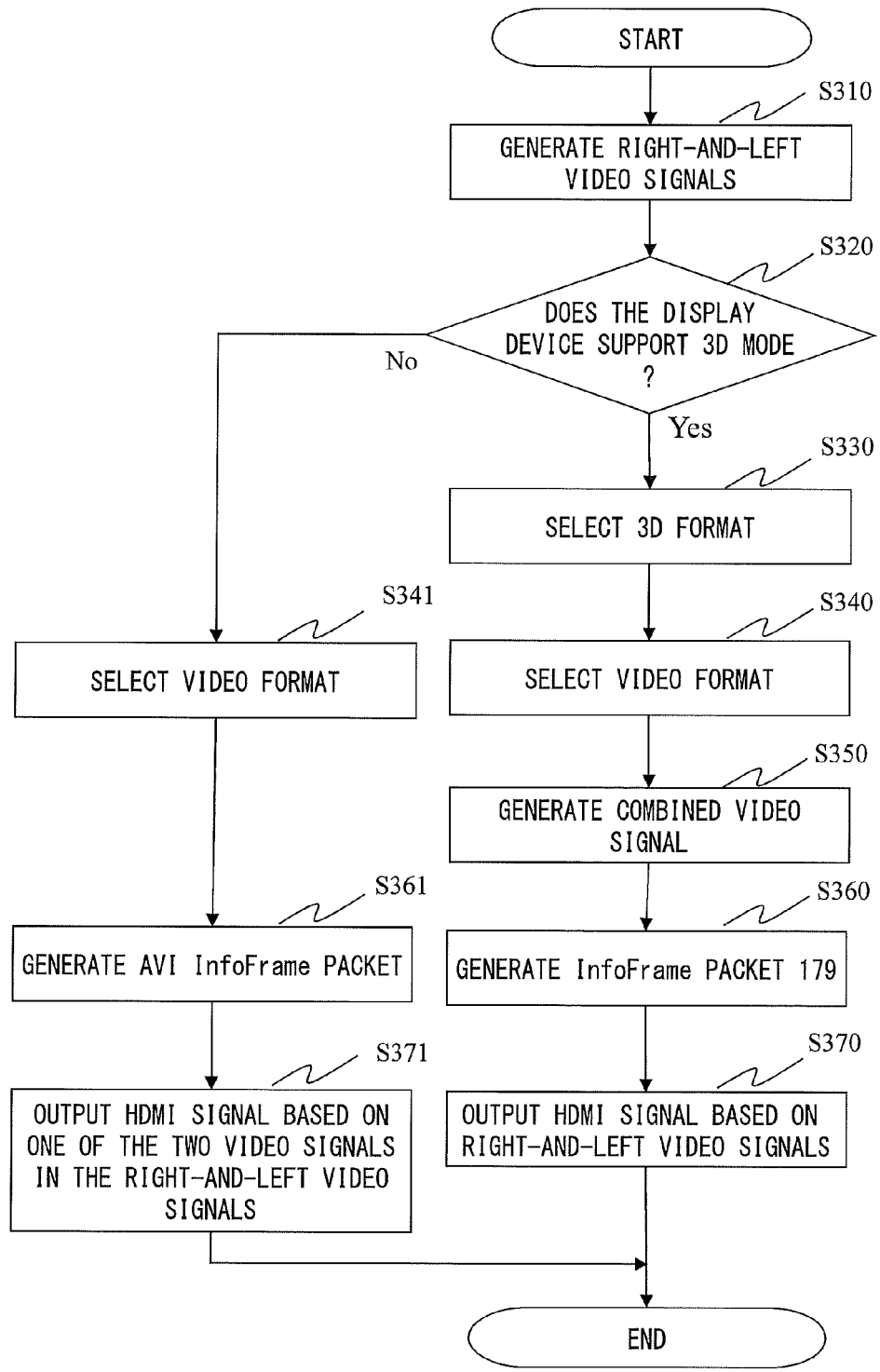
FIG. 23 is a flowchart showing a flow of operations of the output device according to the third embodiment of the present invention.

Next, operations of the output device 120 according to the present embodiment will be described. FIG. 23 is a flowchart showing a flow of the operations of the output device 120. First, the video signal processor 122 generates right-and-left video signals 158 (S310).

Next, the display capability capturer 121 captures the EDID from the display device 220, and refers to HDMI_Video_present and 3D_present of the EDID. Then, the display capability capturer 101 determines whether or not the display device 200 supports the 3D mode (S320). Specifically, when HDMI_Video_present is 1 and 3D_present is 1, the display capability capturer 121 determines that the display device 220 supports the 3D mode (Yes at S320). Alternatively, the display capability capturer 101 determines that the display device 220 does not support the 3D mode (No at S320).

When the display device supports the 3D mode (Yes at S320), the display capability capturer 121 confirms the value of 3D_Multi_present. Then, when 3D_Multi_present is 01 or 10 (all of which are binary numbers), the display capability capturer 121 refers to 3DStructureALL_[15 . . . 0], and acquires 3D formats supported by the display device. Furthermore, when 3D_Multi_present is a value other than that described above, the display capability capturer 121 refers to 3DStructure_i ("i" is an integer from 1 to L), and acquires 3D formats supported by the display device. Then, the display capability capturer 121 selects one 3D format outputted by the output device 120 (S330). The selected 3D format is outputted to the combined video-signal generator 123.

Next, when 3D_Multi_present is 10 (binary number), the display capability capturer 121 obtains a VIC corresponding to a bit of "1" in 3DMASK_[15 . . . 0]. When 3D_Multi_present is 01 (binary number), the Video Data Block of the EDID is referred to, and a VIC supported by the display device 200 is obtained. When 3D_Multi_present is 00 or 11 (all of which are binary numbers), the display capability capturer 121 obtains a VIC corresponding to 2DVICOrder_i, which corresponds to 3DStructure_i ("i" is an integer from 1 to L) selected at step S330. Then, among video formats corresponding to those VICs, the display capability capturer 101 selects one video format that is decodable by the HDMI transmitter 105 (S340). The selected video format is outputted to the combined video-signal generator 123 and the packet generator 104.

Then, the combined video-signal generator 123 generates the combined video signal 159 from the right-and-left video signals 158, based on the 3D format and video format selected by the display capability capturer 121. Furthermore, the combined video-signal generator 123 outputs the combined video signal 159 to the HDMI transmitter 125 (S350). In addition, the combined video-signal generator 123 outputs the 3D format of the combined video signal 159 to the packet generator 124 as the structural information 169.

Then, the packet generator 104 generates the InfoFrame packet 179 including the AVI InfoFrame packet and the specific InfoFrame packet, based on the structural information 169 and the selected video format (S360).

Then, the HDMI transmitter 125 superimposes data of the InfoFrame packet 179 onto the combined video signal 159 generated by the combined video-signal generator 123 during either the horizontal blanking period or the vertical blanking period. Next, the HDMI transmitter 125 outputs, to the display device 220 as the HDMI signal, the video signal on which the data of the InfoFrame packet 179 is superimposed as described above (S370).

On the other hand, when the display device does not support the 3D mode (No at S320), the display capability capturer 121 refers to the Video Data Block of the EDID, and obtains VICs supported by the display device 220. Then, among video formats corresponding to the VICs, the display capability capturer 121 selects one video format that is decodable by the HDMI transmitter 105 (S341).

Next, the packet generator 124 generates the AVI InfoFrame packet based on the selected video format (S361).

Then, the combined video-signal generator 123 outputs the right-and-left video signals 158 to the HDMI transmitter 125 without performing any processes thereon, and the HDMI transmitter 125 encodes a video signal of either one of the right-and-left video signals 158 based on the video format selected by the display capability capturer 121. Next, the HDMI transmitter 125 superimposes data of the AVI InfoFrame packet onto the encoded video signal during either the horizontal blanking period or the vertical blanking period. Then, the HDMI transmitter 125 outputs, to the display device 220 as the HDMI signal, the video signal on which the data of the InfoFrame packet is superimposed as described above (S371).

Next, a configuration of the display device according to the present embodiment will be described. FIG. 24 is a block diagram showing a configuration of the display device according to the present embodiment. In FIG. 24, the display device 220 includes a display capability transmitter 221, an HDMI receiver 222, a packet analyzer 223, an image restorer 224, the memory 205, and a display section 226.

The display capability transmitter 221 transmits the EDID shown in FIG. 21 to the output device 120 in accordance with a request from the display capability capturer 101. It should be noted that, this EDID is configured to the display device 220 in advance at the time of shipment from a factory.

The HDMI receiver 222 separates the HDMI input signal into the combined video signal 159 and the InfoFrame packet 179, outputs the InfoFrame packet 179 to the packet analyzer 203, and outputs the combined video signal 159 to the image restorer 224.

The packet analyzer 223 obtains the structural information 169 from the InfoFrame packet 179. In addition, the packet analyzer 223 obtains, from the AVI InfoFrame packet in the InfoFrame packet 179, the video format 180 regarding the combined video signal 159. The packet analyzer 223 outputs these pieces of information to the image restorer 224.

The image restorer 224 refers to the structural information 169, generates the right-and-left video signals 158 from the combined video signal 159, and outputs the generated video signal to the memory 205.

The memory 205 temporarily stores the right-and-left video signals 158 outputted from the image restorer 224, and displays a three-dimensional picture on the display section 226. It should be noted that since the memory 205 conducts operations identical to the memory 205 of the first embodiment, a reference character identical to that in the first embodiment is provided thereto.

Figure 25:
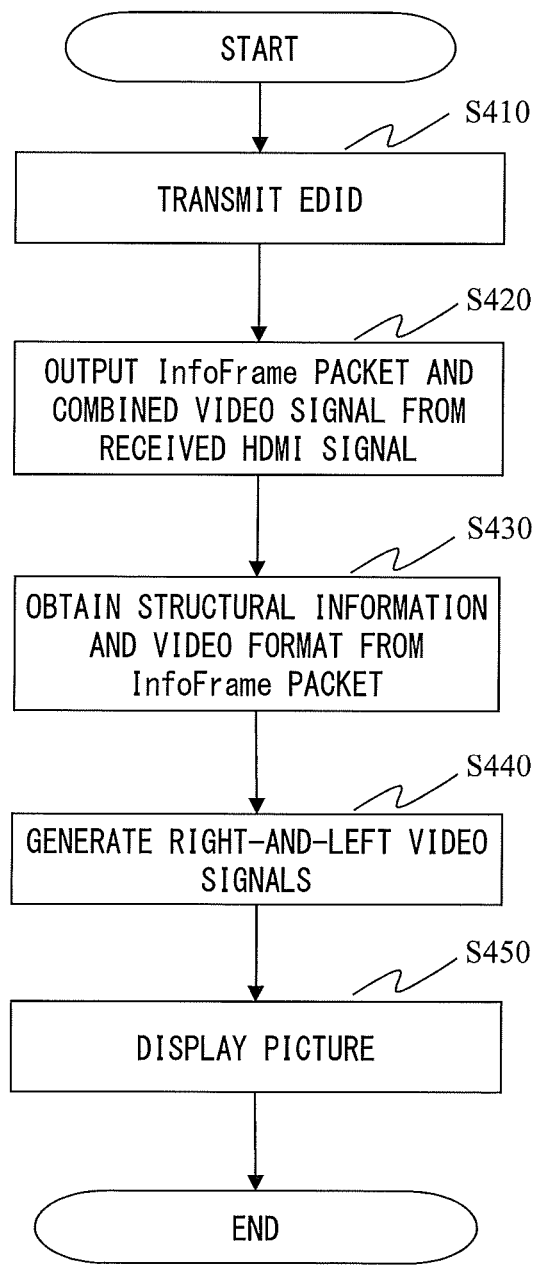
FIG. 25 is a flowchart showing a flow of operations of the display device according to the third embodiment of the present invention.

Next, operations of the display device 220 according to the present embodiment will be described. FIG. 25 is a flowchart showing a flow of the operations of the display device 220. First, the display capability transmitter 221 transmits the EDID to the output device 120 transmission in accordance with a request from the display capability capturer 101 (S410).

Then, the HDMI receiver 222 receives the HDMI signal from the output device 120, and separates the received HDMI signal into the combined video signal 159 and the InfoFrame packet 179, outputs the InfoFrame packet 179 to the packet analyzer 223, and outputs the combined video signal 159 to the image restorer 224 (S420).

Next, the packet analyzer 203 obtains the structural information 169 of the combined video signal 159 from the specific InfoFrame packet in the InfoFrame packet 179. In addition, the packet analyzer 203 obtains the video format 180 of the combined video signal 159 from the AVI InfoFrame packet. The packet analyzer 223 outputs these pieces of information to the image restorer 224 (S430).

Then, the image restorer 224 refers to the structural information 169 and the video format 180, and obtains the right-and-left video signals 158 from the combined video signal 159. Specifically, the image restorer 224 obtains data regarding a left video signal and data regarding a right video signal from right and left video data included in the combined video signal 159, and generates, based on the video format 180, a video signal that has been converted into the video format of the right-and-left video signals 158. Then, the image restorer 224 outputs the generated right-and-left video signals 158 to the memory 205 (S440).

Then, the display section 226 displays the right-and-left video signals 158 stored in the memory 205 as a three-dimensional picture (S450).

Next, advantageous effects of the present embodiment will be described. In the present embodiment, by making maximal use of the existing frameworks of the InfoFrame and EDID, addition of a video-data structure required newly for transmitting three-dimensional pictures is minimized. As a result, data in the EDID (ordinarily, 256 bytes, and 512 bytes even when extended) and in the InfoFrame (27 bytes) are suppressed within capacity limits, and transmission of video signals supporting three-dimensional pictures can be achieved through HDMI.

It should be noted that the video-data structure for three-dimensional pictures is not limited to those described in the present embodiment. For example, the video-data structure may be a data structure in which sub-sampling in the horizontal direction is not performed in Side-by-Side and which the 3D horizontal total pixel number is two times of the 2D horizontal total pixel number; or may be one that alternately includes data of right-and-left video signals on each scanning line. Furthermore, the video-data structure may be one that includes depth information (depth) and graphics information. Such a video-data structure may be defined in areas reserved in 3DStructureALL_[15 . . . 0], 3DStructure_i ("i" is an integer from 1 to L), and 3DStructure.

INDUSTRIAL APPLICABILITY

An output device according to the present invention is applicable to hard disk recorders, DVD players, blue-ray players, etc., that transmit video data through HDMI. In addition, a display device according to the present invention is applicable to televisions, computers, game machines, head mounted displays, etc., that receive video data through HDMI.

DESCRIPTION OF THE REFERENCE CHARACTERS 100, 110, 120, 700 output device
101, 121, 701 display capability capturer
102, 122, 702 video signal processor
103, 113 difference detector
123 combined video-signal generator
104, 114, 124, 703 packet generator
105, 115, 125, 704 HDMI transmitter
150 video signal
151 to 154 cutout image
158 right-and-left video signal
159 combined video signal
160 cutout-area information
169 structural information
170, 179 InfoFrame packet
180 video format
190 await-frame information
200, 210, 220, 900 display device
201, 221, 901 display capability transmitter
202, 222, 902 HDMI receiver
203, 213, 223, 903 packet analyzer
204, 214, 224 image restorer
205, 904 memory
206, 226, 905 display section
800 transmission cable

The invention claimed is:

1. A digital video signal output device for outputting a digital video output signal to an external digital video display device via a transmission interface having a predefined upper limit on its data transmission rate, the digital video signal output device comprising:
a difference detector configured to detect, as a cutout image, a rectangular area that is a portion of the entire image in a single frame of a digital video signal, the image in the rectangular area including a zone where a difference between the entire image in a single frame of the digital video signal and the entire image one frame previous to said frame has occurred, and configured to output cutout-area information specifying at least the rectangular area's position within the entire image; and
a transmitter configured to output a digital video output signal by transmitting, during a video-data period, data representing the cutout image and transmitting, during a blanking period, the cutout-area information and timing information representing a point when the cutout image is to be displayed.

2. The digital video signal output device according to claim 1, wherein the timing information is await-frame information according to which the signal output device stands by for display of a cutout image.

3. The digital video signal output device according to claim 1, wherein if a cutout image is not present, the transmitter outputs a digital video output signal by transmitting, during the blanking period, cutout-area exceptional information.

4. A digital video display device for displaying a video picture based on a digital video input signal inputted via a transmission interface having a predefined upper limit on its data transmission rate, the digital video display device comprising:
a receiver configured to
receive a digital video input signal in which data for a cutout image being a rectangular area that is a portion of the entire image in a single frame of a digital video signal has been transmitted during a video-data period thereof, the image in the rectangular area including a zone where a difference between the entire image in a single frame of the digital video signal and the entire image one frame previous to said frame has occurred,
acquire data for the cutout image from the received signal,
acquire cutout-area information specifying at least the rectangular area's position within the entire image transmitted during a blanking period of the digital video input signal, and
acquire, from the digital video input signal, timing information representing a point when the cutout image is to be displayed;

an image restorer configured to restore an entire image for a single frame and to generate a for-display video signal, based on the data for the cutout image and on the cutout-area information; and a display section configured to display a picture based on the for-display video signal.

5. The digital video display device according to claim 4, wherein the timing information is await-frame information according to which the signal output device stands by for display of a cutout image.

6. The digital video display device according to claim 4, wherein:
   the receiver is configured to acquire cutout-area exceptional information representing an absence of a cutout image in the digital video input signal; and
   the image restorer is configured so as, when the packet analyzer acquires the cutout-area exceptional information, to omit generating the for-display video signal, based on data for the cutout image and the cutout-area information.

* * * * *